United States Patent
Miyazawa et al.

(10) Patent No.: US 8,263,289 B2
(45) Date of Patent: Sep. 11, 2012

(54) FUEL CELL STACK AND METHOD OF PRODUCING ITS SEPARATOR PLATES

(75) Inventors: Atsushi Miyazawa, Kamakura (JP); Motoki Yaginuma, Yokohama (JP); Motoharu Obika, Yokohama (JP); Koshi Takata, Yokosuka (JP); Nobuo Kino, Yokohama (JP); Yosuke Fukuyama, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 512 days.

(21) Appl. No.: 12/296,553

(22) PCT Filed: May 15, 2007

(86) PCT No.: PCT/IB2007/001257
§ 371 (c)(1),
(2), (4) Date: Oct. 9, 2008

(87) PCT Pub. No.: WO2007/135509
PCT Pub. Date: Nov. 29, 2007

(65) Prior Publication Data
US 2009/0092872 A1    Apr. 9, 2009

(30) Foreign Application Priority Data

May 16, 2006    (JP) ................................ 2006-136709

(51) Int. Cl.
*H01M 8/04* (2006.01)
*H01M 8/10* (2006.01)
(52) U.S. Cl. ...................................... 429/514; 429/479
(58) Field of Classification Search ............. 219/121.64; 429/512–514
See application file for complete search history.

(56) References Cited

U.S. PATENT DOCUMENTS

| | | | |
|---|---|---|---|
| 4,230,539 A * | 10/1980 | Saruwatari et al. ........... | 205/223 |
| 2003/0096151 A1 | 5/2003 | Blunk et al. | |
| 2004/0072053 A1 | 4/2004 | Schlag | |
| 2004/0079738 A1* | 4/2004 | Sakamoto et al. ....... | 219/121.82 |
| 2004/0091768 A1 | 5/2004 | Abd Elhamid et al. | |
| 2005/0037212 A1 | 2/2005 | Budinski | |
| 2005/0252892 A1* | 11/2005 | Newman et al. ......... | 219/121.64 |
| 2006/0054664 A1* | 3/2006 | Strobel et al. .............. | 228/179.1 |
| 2006/0099481 A1* | 5/2006 | Ji et al. ............................ | 429/38 |

FOREIGN PATENT DOCUMENTS

| | | |
|---|---|---|
| DE | 103 01 052 | 7/2004 |
| JP | 2000-138067 | 5/2000 |

(Continued)

*Primary Examiner* — Ula C Ruddock
*Assistant Examiner* — Daniel Gatewood
(74) *Attorney, Agent, or Firm* — Drinker Biddle & Reath LLP

(57) ABSTRACT

A cell of a fuel cell includes a membrane electrode assembly, and metal first and second separators which sandwich the membrane electrode assembly to form gas flow paths disposed on each side of the membrane electrode assembly. A back surface of the first separator and a back surface of the second separator, the first separator and the second separator being included in adjacent cells, are in contact with each other, thereby forming a temperature-control medium flow path between the first separator and the second separator. In the first separator and the second separator, corrosion-resistant coating layers are provided only on reaction-side surfaces of the first separator and the second separator, the reaction-side surfaces facing the membrane electrode assembly, and portions where the back surface of the first separator is in contact with the back surface of the second separator are joined by welded portions.

11 Claims, 15 Drawing Sheets

FOREIGN PATENT DOCUMENTS

| | | |
|---|---|---|
| JP | 2005-002411 | 1/2005 |
| JP | 2005-190968 | 7/2005 |
| JP | 2005-276807 | 10/2005 |
| JP | 2005-317479 | 11/2005 |
| JP | 2006-114444 | 4/2006 |
| WO | WO 03/096457 | 11/2003 |

* cited by examiner

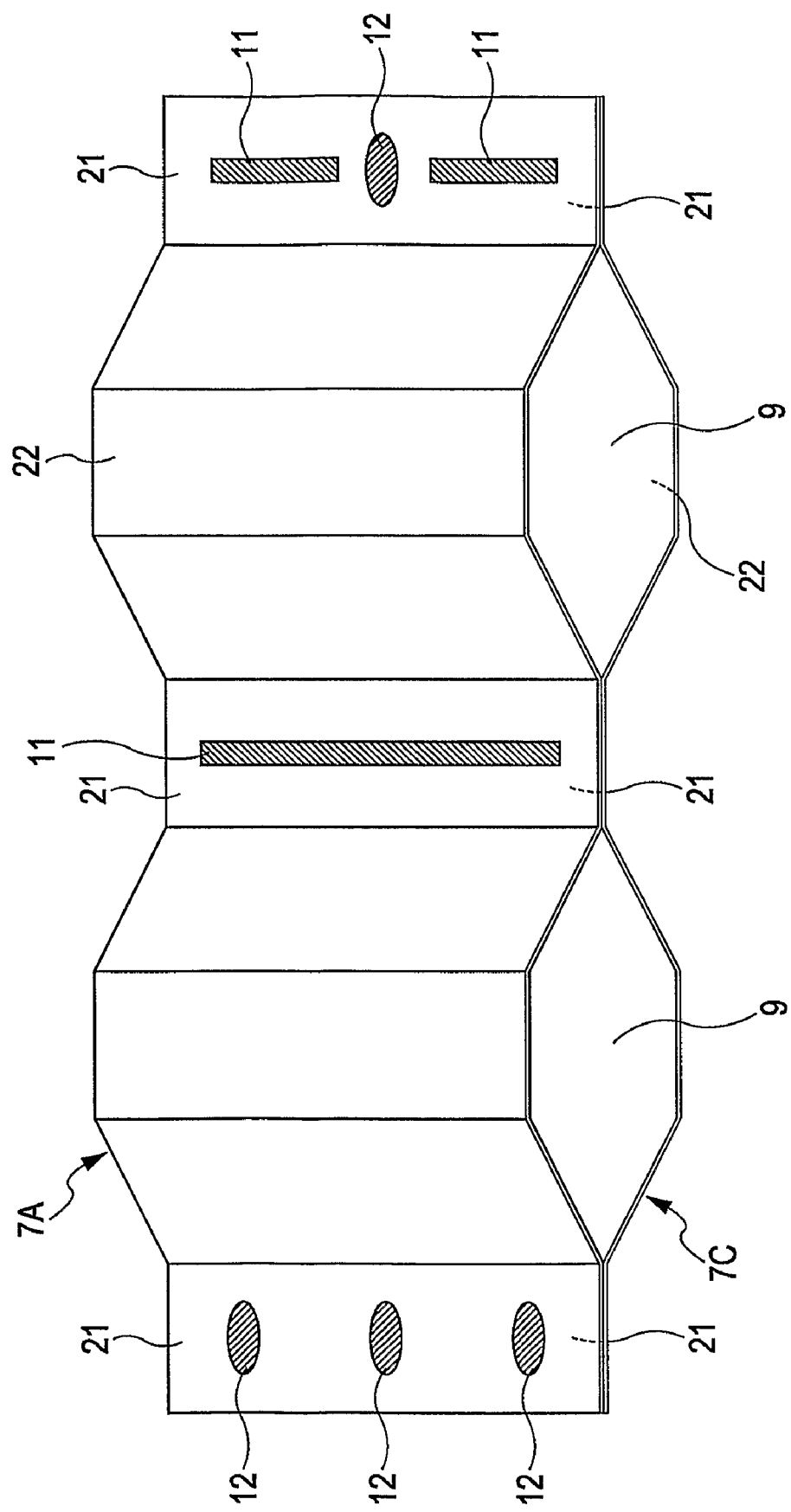

FUEL CELL STACK AND METHOD OF PRODUCING ITS SEPARATOR PLATES

CROSS-REFERENCE TO RELATED APPLICATIONS

This application claims priority to Japanese Patent Application No. 2006-136709, filed May 16, 2006, the disclosure of which is incorporated by reference herein in its entirety.

BACKGROUND OF THE INVENTION

1. Field of the Invention

The present invention relates to a fuel cell stack and a method of producing the same. In particular, the present invention relates to a fuel cell stack that includes separators formed of a metal plate and a method of producing the same.

2. Description of the Related Art

Solid polymer fuel cells include a solid polymer electrolyte membrane having proton conductivity. In such solid polymer fuel cells, a fuel gas is supplied to an anode, which is one of a pair of electrodes provided so as to sandwich the electrolyte membrane, and an oxidizer gas is supplied to a cathode, which is another electrode. Solid polymer fuel cells generate electric power utilizing electrochemical reactions caused on the surfaces of the electrolyte membrane.

Such a fuel cell is composed of cells as described below, and the cells, the number of which is related to the required output voltage, are arrayed in a line. The total output power generated by the cells of the fuel cell is obtained from the powers of the cells connected in series.

Each of the cells of the fuel cell includes a membrane electrode assembly (MEA) in which an electrolyte membrane is sandwiched between a pair of electrode catalyst layers, and separators which constitute gas flow paths disposed at each side of the membrane electrode assembly.

Each of the separators constitutes a gas flow path through which a fuel gas or an oxidizer gas flows, and also constitutes a flow path through which a temperature-control medium flows.

The entire separators are made of a conductive material because the separators also function as a conductive path for obtaining the output from the electrode catalyst layers of each cell of the fuel cell.

Hitherto, separators used for a fuel cell were made of carbon, which has both corrosion resistance and conductive properties. Recently, however, metal separators have been used to reduce the cost of the fuel cell, and to reduce the thickness of the separator to improve the output density.

Japanese Unexamined Patent Application Publication No. 2005-190968 discloses a metal separator produced by plating a noble metal layer, which serves as a corrosion-resistant coating layer, on a surface of a stainless steel plate.

SUMMARY OF THE INVENTION

However, in such a known metal separator, since the corrosion-resistant coating layer is formed on the surface thereof, the amount of expensive noble metal used is increased, resulting in an increase in the cost of the fuel cell.

The present invention overcomes the above problem. An object of the present invention is to provide a fuel cell stack in which the amount of expensive noble metal used can be reduced and which has corrosion resistance and conductive properties required for separators, and a method of producing the same.

In an embodiment, the invention provides a fuel cell stack, including a membrane electrode assembly, a metal separator on each side of first and second surfaces of the membrane electrode assembly, and a temperature-control medium flow path. The membrane electrode assembly includes electrode catalyst layers and an electrolyte membrane between the electrode catalyst layers. Each metal separator includes a corrosion-resistant coating layer provided only on a reaction-side surface facing the membrane electrode assembly. Each metal separator constitutes gas flow paths. The membrane electrode assembly and the metal separators constitute a cell of a fuel cell. The temperature-control medium flow path is provided by forming joined portions where back surfaces of the metal separators of adjacent stacked cells are in contact with each other.

In another embodiment, the present invention provides a method of producing a fuel cell stack, including the steps of forming a corrosion-resistant coating layer on a surface of individual metal separators, forming a temperature control medium flow path by joining portions where surfaces of the metal separators of adjacent stacked cells not having the corrosion-resistant coating layer thereon are in contact with each other, and forming gas flow paths by joining the corrosion-resistant coating layers of the metal separators on each side of first and second surfaces of a membrane electrode assembly, the membrane electrode assembly including electrode catalyst layers and an electrolyte membrane between the electrode catalyst layers.

Since the corrosion-resistant coating layer is provided on the reaction-side surfaces of a first separator and a second separator, corrosion resistance on the reaction-side surfaces can be satisfactorily ensured. Conductive properties on the reaction-side surfaces are maintained via the corrosion-resistant coating layer, thereby maintaining a low contact resistance between the first separator and the membrane electrode assembly and between the second separator and the membrane electrode assembly.

The corrosion-resistant coating layer is not provided on the back surface of the first separator and the back surface of the second separator because corrosion resistance required for these separators is low. Accordingly, the amount of expensive noble metal used for the corrosion-resistant coating layer can be reduced.

Since portions where the back surface of the first separator and the back surface of the second separator that are in contact with each other are joined, the resistance between the back surfaces, on which the corrosion-resistant coating layer is not provided, can be reduced via the joined portions of the back surfaces. Accordingly, the power generation performance of the fuel cell can be improved.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 5 is a perspective view showing first and second separators according to an embodiment of the present invention;

DETAILED DESCRIPTION OF THE PREFERRED EMBODIMENTS

An embodiment of a fuel cell separator, a fuel cell stack, and a method of producing the fuel cell stack of the present invention will now be described with reference to the attached drawings.

Figure 1:
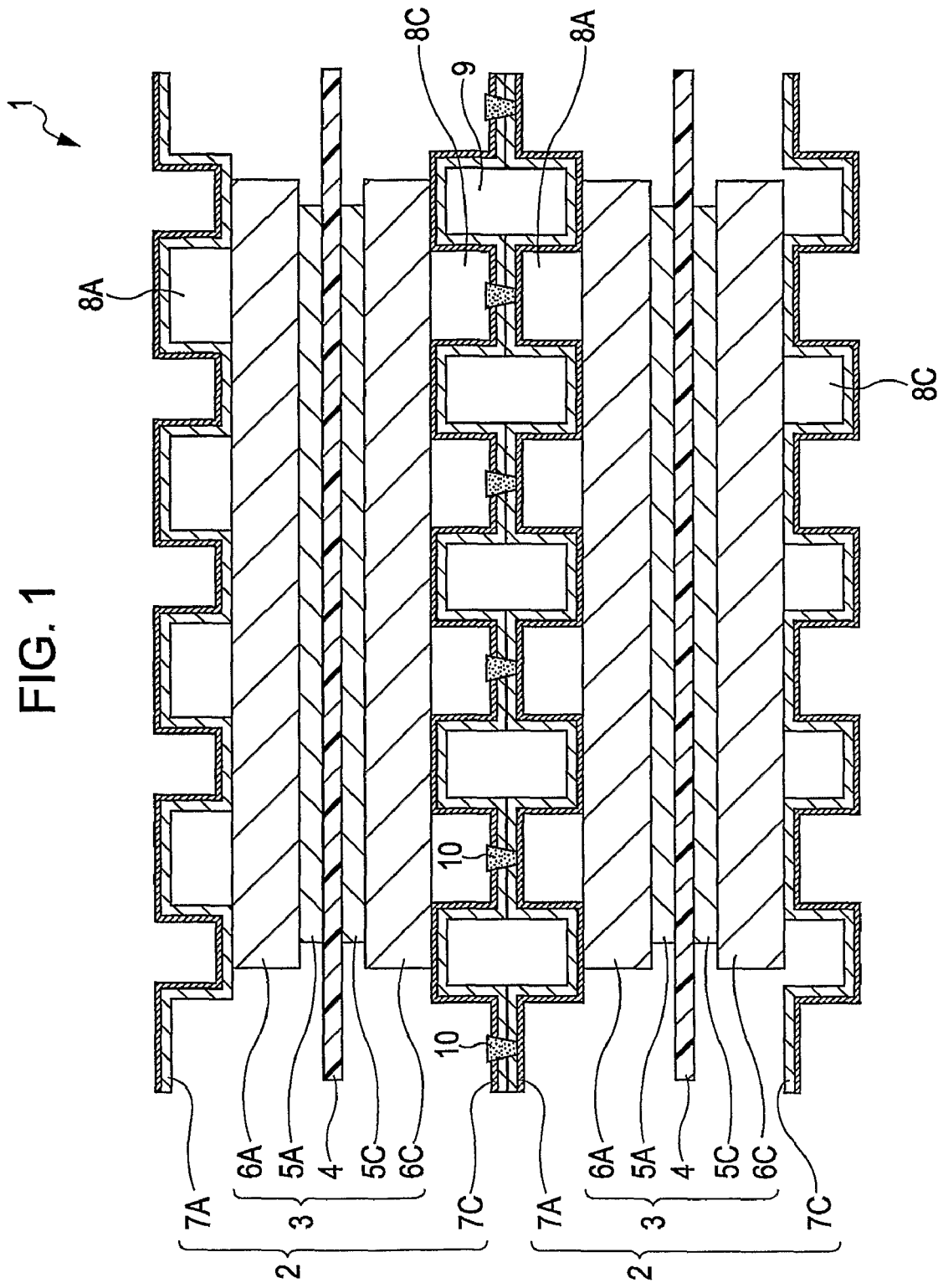
FIG. 1 is a cross-sectional view of a fuel cell stack according to an embodiment of the present invention.

FIG. 1 is a cross-sectional view of the relevant part of a fuel cell stack in which cells having separators according to an embodiment of the present invention are stacked. In a fuel cell stack 1, a plurality of cells 2 of a fuel cell are stacked in series and an end plate (not shown) is provided at each end in the stacking direction. A plurality of tie rods (not shown) draw the end plates, thereby applying a clamping load to each cell 2 in the stacking direction.

In a fuel cell installed in an automobile, for example, 300 to 400 cells 2 are stacked in series in the fuel cell stack 1.

The cell 2, which is provided as a unit, includes an electrolyte membrane electrode assembly (hereinafter referred to as "membrane electrode assembly" (MEA)) 3, a first separator 7A and a second separator 7C. The membrane electrode assembly 3 includes a pair of electrode catalyst layers 5A and 5C and an electrolyte membrane 4 provided between the electrode catalyst layers 5A and 5C. The first separator 7A and the second separator 7C form gas flow paths 8A and 8C, respectively, on either side of the membrane electrode assembly 3.

The membrane electrode assembly 3 includes the solid polymer electrolyte membrane 4 having proton conductivity. The electrode catalyst layers 5A and 5C of either electrode are provided at either surface of a reaction area of the electrolyte membrane 4. Furthermore, gas diffusion layers 6A and 6C of either electrode are provided so as to sandwich the electrode catalyst layers 5A and 5C. The electrode catalyst layers 5A and 5C are made of, for example, platinum or an alloy of platinum and another metal. The gas diffusion layers 6A and 6C are made of, for example, a material having gas diffusion properties and conductive properties, such as a carbon cloth, carbon paper, or carbon felt.

In the fuel cell, a fuel gas is supplied to an anode, which is one of the pair of electrodes provided so as to sandwich the electrolyte membrane 4, and an oxidizer gas is supplied to a cathode, which is the other of the pair of electrodes. Accordingly, reactions represented by formulae (1) and (2) are conducted on either surface of the electrolyte membrane 4 to generate electric power.

Anodic reaction: $H_2 \rightarrow 2H^+ + 2e^-$ (1)

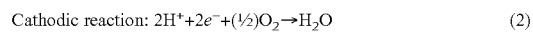

Cathodic reaction: $2H^+ + 2e^- + (\tfrac{1}{2})O_2 \rightarrow H_2O$ (2)

A gasket (not shown) is disposed on a peripheral area surrounding the reaction area of the electrolyte membrane 4 at each side of the membrane electrode assembly 3. The first separator 7A and the second separator 7C sandwich the membrane electrode assembly 3, with the gaskets therebetween.

The gas flow path 8A for introducing an anode gas is provided between the first separator 7A and the gas diffusion layer 6A. For example, hydrogen gas is supplied as the anode gas from an inlet manifold (not shown) to the gas flow path 8A and then supplied to the gas diffusion layer 6A through the gas flow path 8A. Gas not used for the reaction is discharged to an outlet manifold.

The gas flow path 8C for introducing a cathode gas is provided between the second separator 7C and the gas diffusion layer 6C. For example, air is supplied as the cathode gas from an inlet manifold to the gas flow path 8C and then supplied to the gas diffusion layer 6C through the gas flow path 8C. Gas not used for the reaction is discharged to an outlet manifold.

A temperature-control medium flow path 9 through which a temperature-control medium flows is provided between the first separator 7A and the second separator 7C. For example, cooling water is introduced as the temperature-control medium from an inlet manifold into the temperature-control medium flow path 9, supplied between the first separator 7A and the second separator 7C, and then discharged to an outlet manifold. The temperature-control medium absorbs heat of reaction via the first separator 7A and the second separator 7C to cool the fuel cell stack 1.

The temperature-control medium preferably has a high electric resistance. Antifreeze, which does not freeze even in cold regions, is used for fuel cells installed in automobiles.

Each of the first separator 7A and the second separator 7C is made of a metal plate. For example, SUS316L stainless steel is used for the first separator 7A and the second separator 7C in consideration of operating conditions of the fuel cell and the environment in the cell. The base material of the first separator 7A and the second separator 7C is not limited thereto and may be a stainless steel containing at least one of Fe, Ni, and Cr as a main component, a metal selected from any one of Al, Ti, Cu, Zn, Mg, Mn, Pb, Au, Ag, Pt, Pd, Ru, W, Ni, Cr, Sn, and Fe, or an alloy containing these metals as main components.

The first separator 7A and the second separator 7C are produced by press forming a metal plate using a die in which the shapes of the flow path and the like are formed. The thickness of the metal plate may be set to, for example, in the range of about 0.1 to 1.0 mm.

Figure 2:
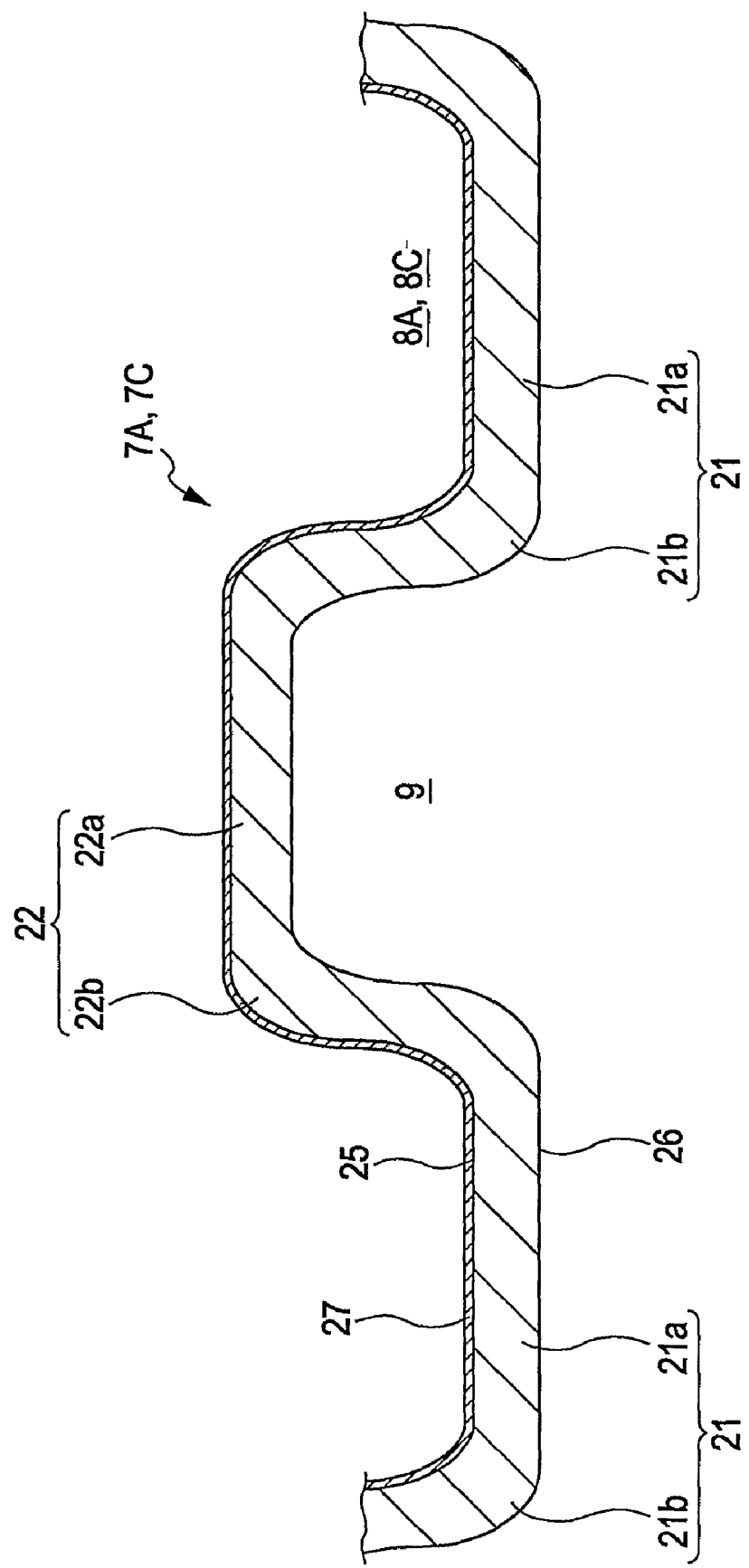
FIG. 2 is a cross-sectional view of a first separator or a second separator according to an embodiment of the present invention.

FIG. 2 is a cross-sectional view of the first separator 7A or the second separator 7C. Each of the first separator 7A and the second separator 7C is a corrugated plate in which projecting portions 22 adjacent to the gas diffusion layer 6A or 6C and projecting portions 21 adjacent to another first separator 7A or another second separator 7C of an adjacent cell 2 of the fuel cell are alternately arrayed. The width of each gas flow path 8A or 8C formed between the projecting portion 22 and the width of the temperature-control medium flow path 9 formed between the projecting portions 21 may be, for example, in the range of about 0.1 to 5.0 mm.

Each of the first separator 7A and the second separator 7C has a reaction-side surface 25 facing the membrane electrode assembly 3 and a back surface 26 opposite to the reaction-side surface 25. The reaction-side surface 25 forms the gas flow path 8A or 8C, and the back surface 26 forms the temperature-control medium flow path 9.

Although stainless steels exhibit corrosion resistance superior to that of other iron-based materials by the formation of a passive film, they have insufficient corrosion resistance in a strongly acidic environment, in particular, corrosion resistance in an acidic environment of sulfuric acid, which is unique to fuel cells. Accordingly, when the first separator 7A and the second separator 7C are formed of a stainless steel without further treatment, corrosion may occur.

To solve this problem, in the first separator 7A and the second separator 7C, which are composed of a stainless steel base material, a corrosion-resistant coating layer 27 is provided only on the reaction-side surface 25. This corrosion-resistant coating layer is not provided on the back surface 26.

The corrosion-resistant coating layer 27 provided on the reaction-side surface 25 is made of, for example, gold (Au) and formed by plating so as to have a thickness of about 5 μm. Thus, corrosion resistance in a strongly acidic environment, in particular, corrosion resistance in an acidic environment of sulfuric acid, which is unique to fuel cells, can be ensured.

The corrosion-resistant coating layer 27 provided on the reaction-side surface 25 is not limited to a gold-plated layer. Alternatively, the corrosion-resistant coating layer 27 may be formed by, for example, a coating using platinum (Pt), palladium (Pd), or titanium (Ti) or a surface modification treatment for improving corrosion resistance.

On the other hand, this corrosion-resistant coating layer is not formed on the back surfaces 26 of the first and second separators 7A and 7C, and an oxide film is formed on the surface layers instead. This oxide film has an insulating property and improves corrosion resistance of the first separator 7A and the second separator 7C. However, the oxide film increases the contact resistance between the first separator 7A and the second separator 7C and the internal resistance of the fuel cell.

Figure 3:
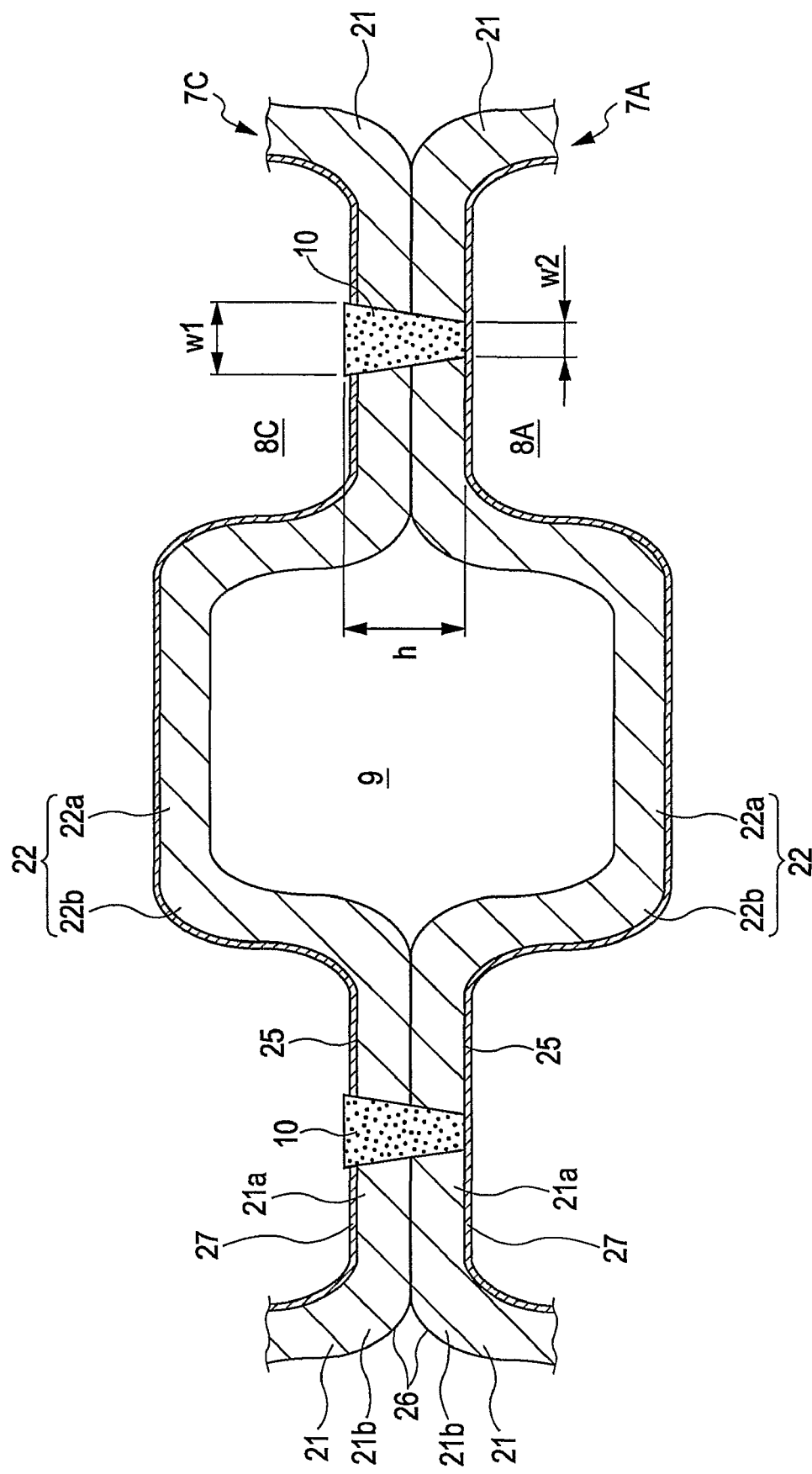
FIG. 3 is a cross-sectional view of first and second separators according to an embodiment of the present invention.

To solve this problem, as shown in FIG. 3, welded portions 10 are provided as joined portions for joining the back surface 26 of the first separator 7A and the back surface 26 of the second separator 7C of adjacent cells 2 of the fuel cell. The welded portions 10 are provided in the reaction area between the electrode catalyst layers 5A and 5C and reduce the penetration resistance of the first separator 7A and the second separator 7C.

As shown in FIG. 3, dimensions, such as a base end width w1, a leading end width w2, and a depth h, of each welded portion 10 can be freely determined. When the welding depth h is set to a large value, the contact resistance between the first separator 7A and the second separator 7C can be reduced.

Examples of a method of joining the first separator 7A and the second separator 7C include various welding methods, such as an electric arc welding, a laser welding, a tungsten inert gas (TIG) welding, a metal active gas (MAG) welding, a metal inert gas (MIG) welding, a plasma welding, and an electron beam welding. Alternatively, brazing may also be employed as the method of joining the first separator 7A and the second separator 7C.

The welded portions 10 are formed by heating the second separator 7C disposed at the cathode side, and welding the first separator 7A and the second separator 7C.

When the welded portions 10 are formed by heating the second separator 7C disposed at the cathode side to weld the first separator 7A and the second separator 7C, the leading end width w2 of the welded portion 10 disposed on the first separator 7A at the anode side is smaller than the base end width w1 of the welded portion 10 disposed on the second separator 7C at the cathode side.

The projecting portions 21 and 22 formed by press forming a metal plate includes rib flat portions 21a and 22a extending so as to have a planar shape, and rib corner portions 21b and 22b bending in an arc shape at the ends of the rib flat portions 21a and 22a, respectively. In the first separator 7A and the second separator 7C, the rib flat portions 21a, which constitute groove bottoms forming the gas flow paths 8A and 8C, are welded. The welded portions 10 joining rib flat portions 21a are formed in an area extending from each rib corner portion 21b to the adjacent rib corner portion 22b.

Figure 4A:
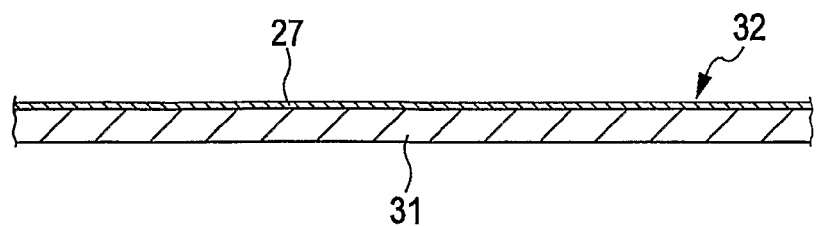
FIGS. 4A to 4C are cross-sectional views showing a process of producing first and second separators according to an embodiment of the present invention.
Figure 4B:
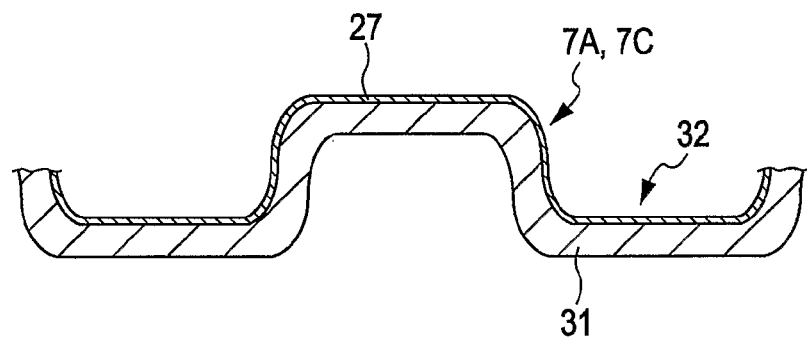
Figure 4C:
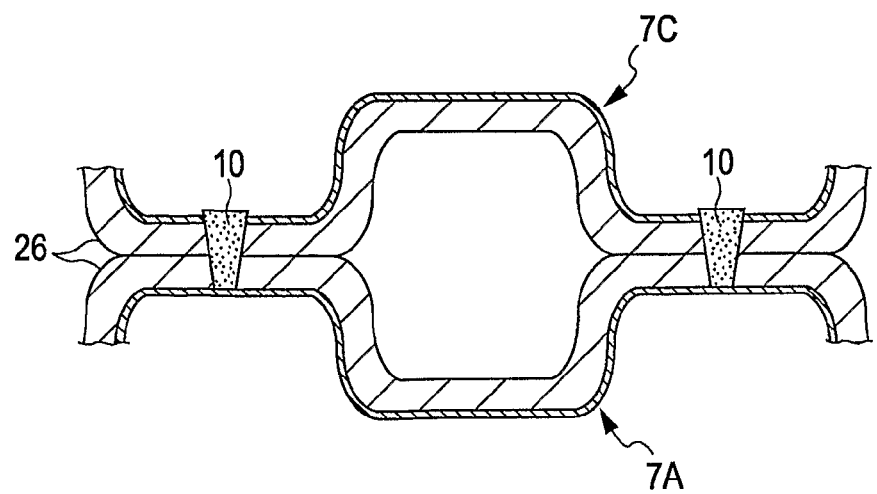

A process of producing the first separator 7A and the second separator 7C will now be described with reference to FIGS. 4A to 4C. First, as shown in FIG. 4A, a corrosion-resistant coating layer 27 is formed on a base material 31 to prepare a metal plate 32. As shown in FIG. 4B, the metal plate 32 is subjected to press forming to prepare a first separator 7A and a second separator 7C. Subsequently, as shown in FIG. 4C, back surface 26 of the first separator 7A and back surface 26 of the second separator 7C are joined by welded portions 10. Thus, an assembly is formed by integrating the first separator 7A and the second separator 7C.

The process of producing the first separator 7A and the second separator 7C is not limited thereto. Alternatively, the base material 31 may be subjected to press forming in advance, and the corrosion-resistant coating layer 27 may then be formed on the base material 31.

A description will be made of the operation and advantages of the first separator 7A and the second separator 7C having the above structure.

In the first separator 7A and the second separator 7C, the reaction-side surfaces 25 facing the membrane electrode assembly 3 require corrosion resistance at a high temperature, a high humidity, and in an acidic atmosphere. In order to meet this need, by forming the corrosion-resistant coating layer 27 which is not readily degraded by oxidation on each reaction-side surface 25, the stainless steel, which is the base material of the first separator 7A and the second separator 7C, can be protected. Accordingly, satisfactory corrosion resistance can be provided. Furthermore, conductivity of each reaction-side surface 25 can be maintained via the corrosion-resistant coating layer 27. Consequently, low contact resistances between the first separator 7A and the membrane electrode assembly 3 and between the second separator 7C and the membrane electrode assembly 3 can be maintained.

On the other hand, in the first separator 7A and the second separator 7C, corrosion resistance required for the back surfaces 26 constituting the temperature-control medium flow path 9 is lower than that for the reaction-side surfaces 25. Accordingly, the corrosion-resistant coating layer is not formed on each back surface 26. Consequently, the work-hours for forming the corrosion-resistant coating layer 27 can be reduced and the amount of noble metal used for the corrosion-resistant coating layer 27 can also be reduced compared with a known structure in which the corrosion-resistant coating layer is formed on both surfaces 25 and 26 of the first separator 7A and the second separator 7C. Accordingly, the cost of the fuel cell can be reduced.

Although the corrosion-resistant coating layer is not formed on each back surface 26, the back surface 26 is exposed to cooling water (temperature-control medium) flowing through the temperature-control medium flow path 9 during the operation of the fuel cell. As a result, a passivation treatment may be performed on each back surface 26 to form an oxide film thereon, thus improving corrosion resistance of the back surface 26.

The oxide film formed on the surface of the back surface 26 is an insulating film. However, since the back surface 26 of the first separator 7A and the back surface 26 of the second separator 7C of adjacent cells 2 of the fuel cell are joined by the welded portions 10, the penetration resistance of the first separator 7A and the second separator 7C can be reduced at the welded portions 10. Accordingly, the power generation performance of the fuel cell can be improved.

Furthermore, since the first separator 7A and the second separator 7C are integrated by the welded portions 10, misalignment of both separators can be prevented and the number of components constituting the fuel cell stack 1 can be reduced, thus facilitating easy assembly of the fuel cell stack 1.

By forming the welded portions 10, the corrosion-resistant coating layer 27 is removed and the base material may be exposed to the surface. To solve this problem, welding of the welded portions 10 is performed from the cathode side so that damage of the corrosion-resistant coating layer 27 due to the formation of the welded portions 10 can be suppressed on the first separator 7A disposed at the anode side, which is more susceptible to corrosion than the second separator 7C disposed at the cathode side. Accordingly, a decrease in corrosion-resistant performance can be minimized.

Example 1

In Example 1, as shown in FIG. 5, linear welded portions 11 and dot welded portions 12 are provided on a first separator 7A and a second separator 7C in any arrangement in accordance with the dimensions of projecting portions 21 and 22, warping of the separators 7A and 7C after press forming, and the like.

When flow paths 8A, 8C, and 9 formed by the first separator 7A and the second separator 7C linearly extend, projecting portions 21 are in contact with each other without any clearance. On the other hand, when the flow paths 8A, 8C, and 9 have a serpentine shape, a clearance may be partly formed between the projecting portions 21. Accordingly, the linear welded portions 11 and dot welded portions 12 are appropriately arranged in combinations in accordance with a distribution state of contact portions of the first separator 7A and the second separator 7C.

When the ratio of a welded area (joined area) corresponding to the welded portion 10 to the contact area of the first separator 7A and the second separator 7C is defined as a welded area ratio (joined area ratio), the welded area ratio is set to 5% or more.

The welded portion 10 may be formed by joining the entire areas of rib flat portions 21a (see FIG. 3). In this case, crevice corrosion caused between adjacent rib flat portions 21a can be suppressed.

Figure 6:
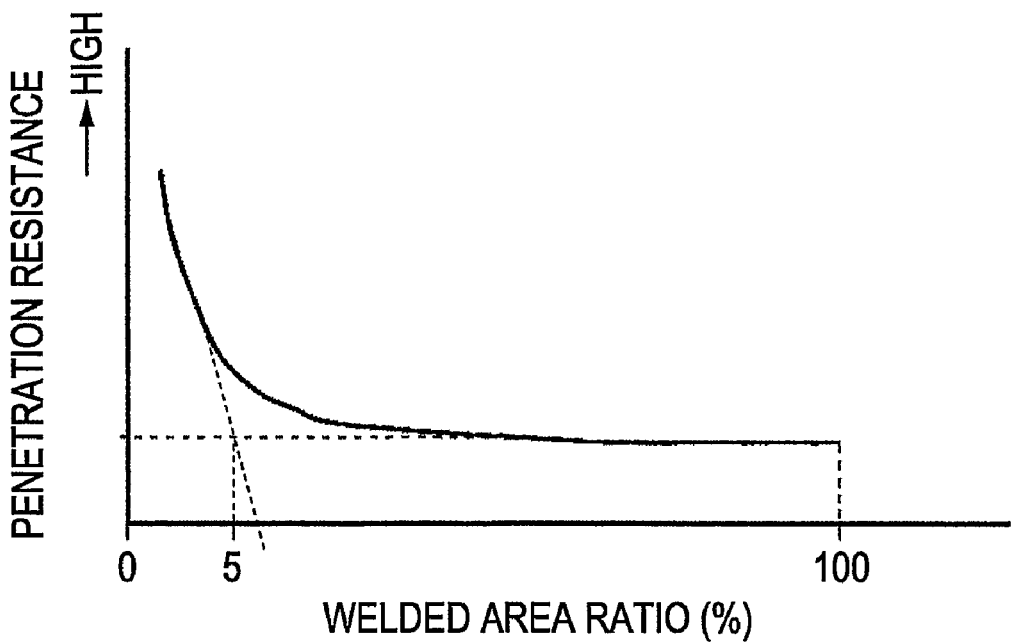
FIG. 6 is a graph showing the relationship between a welded area ratio and the penetration resistance of first and second separators according to an embodiment of the present invention.

FIG. 6 shows experimental results of measured penetration resistances of the first separator 7A and the second separator 7C in the case where the welded area ratio was varied while the first separator 7A and the second separator 7C were compressed with a predetermined load. Referring to FIG. 6, when welding was not performed, that is, when the welded area ratio was 0%, the contact resistance between the first separator 7A and the second separator 7C was high. The penetration resistance was markedly decreased until the welded area ratio was increased to 5%. The penetration resistance was then gradually decreased as the welded area ratio exceeded 5% and was increased to 100%. That is, the point at which the welded area ratio was 5% is a turning point of this characteristic. Accordingly, when the welded area ratio is set to 5%, the penetration resistance of the first separator 7A and the second separator 7C can be sufficiently decreased, and in addition, the work-hours for welding can be reduced, thereby increasing productivity.

Figure 7:
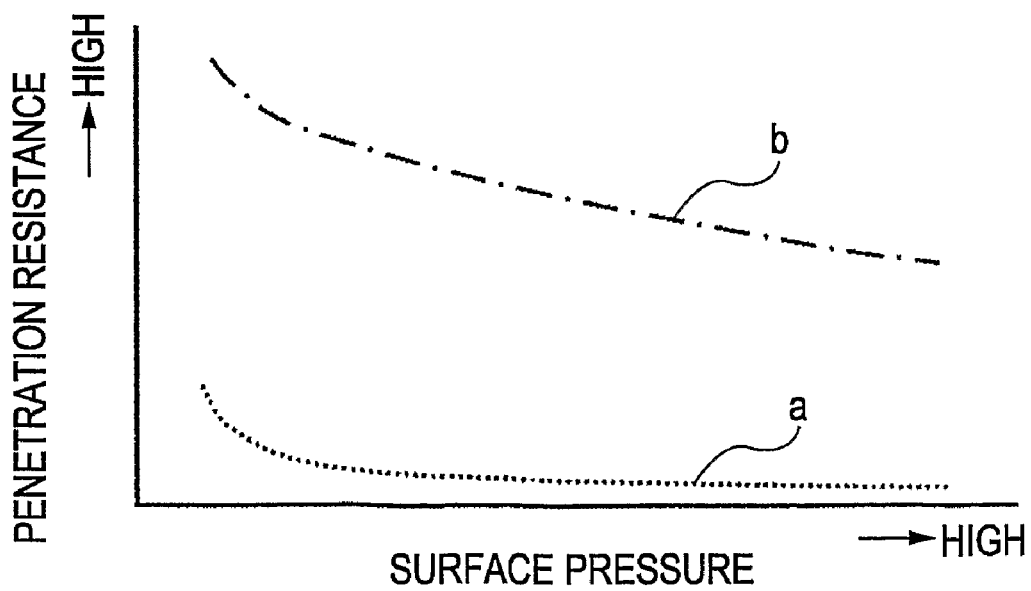
FIG. 7 is a graph showing the relationship between the surface pressure and the penetration resistance of first and second separators according to an embodiment of the present invention.

FIG. 7 shows experimental results of measured penetration resistances of the first separator 7A and the second separator 7C in the case where the surface pressure between the first separator 7A and the second separator 7C was varied. In FIG. 7, characteristic "a" represents a result in the case where the first separator 7A and the second separator 7C were welded with a welded area ratio of 50%, and characteristic "b" represents a result in the case where the first separator 7A and the second separator 7C were not welded. Referring to FIG. 7, in the sample in which the first separator 7A and the second separator 7C were welded, the resistance could be markedly decreased and the change in the resistance relative to the change in the surface pressure was small, compared with the sample in which the first separator 7A and the second separator 7C were not welded.

Figure 8:
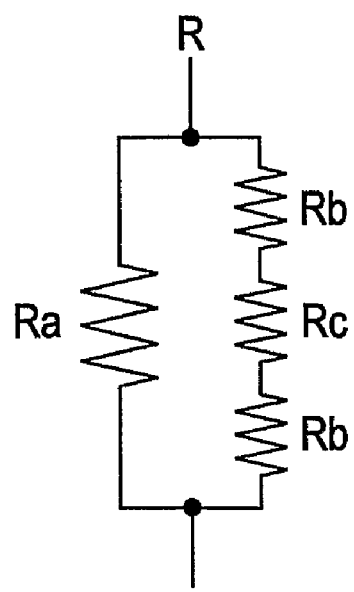
FIG. 8 is a diagram showing the structure of the penetration resistance of first and second separators according to an embodiment of the present invention.

FIG. 8 shows the configuration of an electric conduction path of the first separator 7A and the second separator 7C. When the welded area ratio is not 100%, the penetration resistance R in the electric conduction path is represented by a parallel combined resistance of a resistance Ra of the welded portion 10, a penetration resistance Rb of the base material, and a contact resistance Rc at the contact portion between the back surfaces 26 and satisfies the following relationship:

$$1/R = (1/Ra) + 1/(2Rb + Rc)$$

Figure 9:
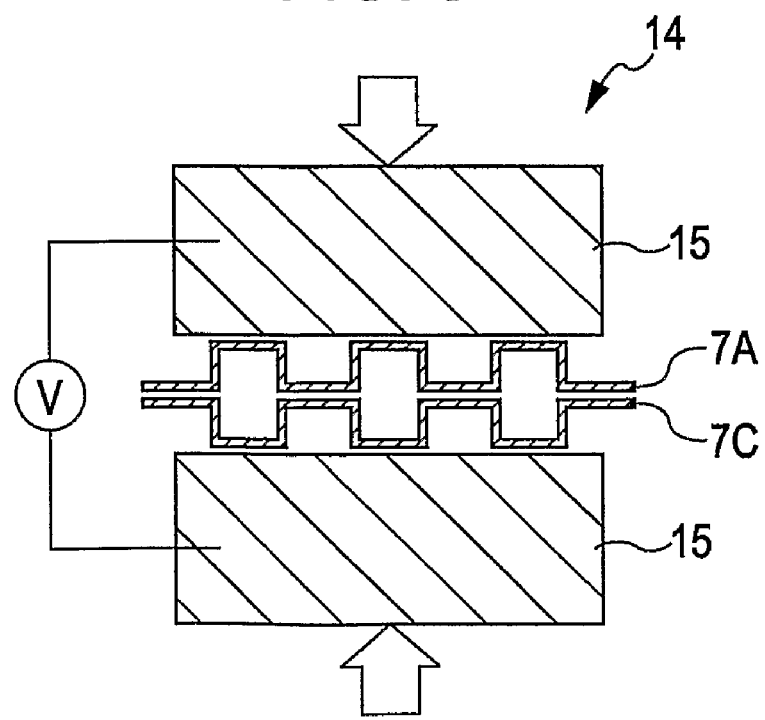
FIG. 9 is a schematic view of a device for measuring the penetration resistance of first and second separators according to an embodiment of the present invention.

FIG. 9 shows a measuring device 14 for measuring the penetration resistance of the first separator 7A and the second separator 7C. In this measuring device 14, the first separator 7A and the second separator 7C are sandwiched between terminal blocks 15 made of thick plates, and a current I (A) is supplied between the terminal blocks 15 while a compressive load is applied to the terminal blocks 15. In this case, the voltage V (V) between the terminal blocks 15 is determined. The resistance R (Ω) is calculated from the current I (A) and the voltage V (V) using Ohm's law.

Example 2

In Example 2, oxide films on the back surface 26 of the first separator 7A and the back surface 26 of the second separator 7C are removed and the back surfaces 26 thereof are then welded.

In this example, to remove the oxide film, base materials of the first separator 7A and the second separator 7C are immersed in a sulfuric acid-acidic solution, and a predetermined electrical potential is applied to the base materials.

Figure 10:
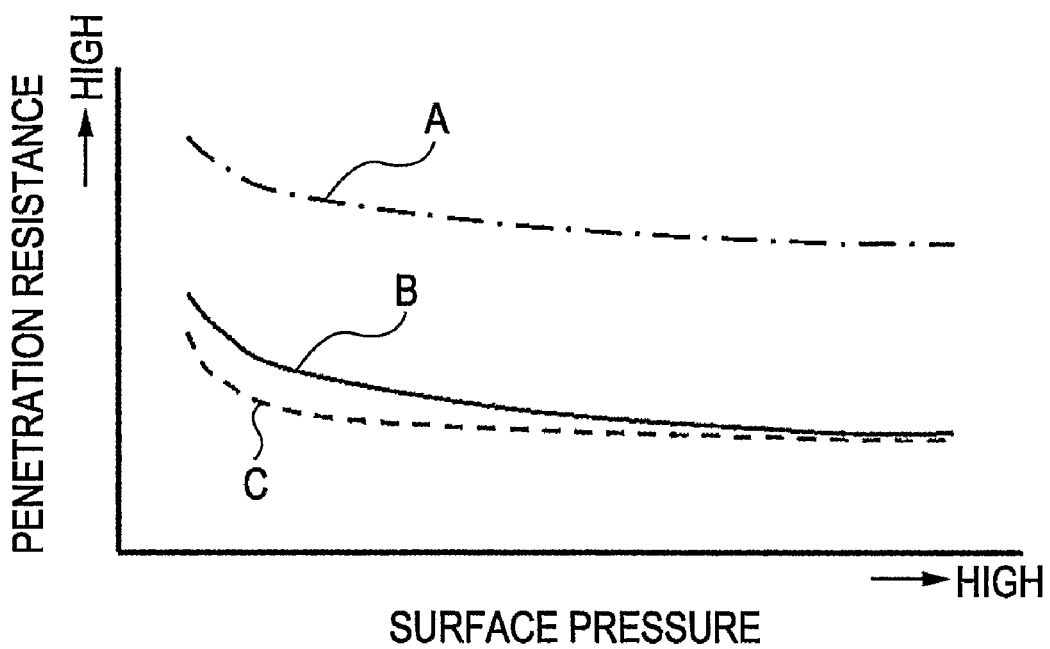
FIG. 10 is a graph showing the relationship between the surface pressure and the penetration resistance of first and second separators according to an embodiment of the present invention in the case where an oxide film is present or removed.

FIG. 10 shows experimental results of measured penetration resistances of the first separator 7A and the second separator 7C in the case where the surface pressure between the first separator 7A and the second separator 7C was varied. In FIG. 10, characteristic A represents a result in the case where the welding was performed without removing the oxide films on the back surfaces 26, characteristic B represents a result in the case where the oxide films on the back surfaces 26 were removed with an acid and the welding was then performed, and characteristic C represents a result in the case where the oxide films on the back surfaces 26 were removed by an acid and electrolysis and the welding was then performed. These results showed that the penetration resistance in characteristics B and C was markedly lower than that of characteristic A, and the penetration resistance in characteristic C was lower than that in characteristic B in a low surface pressure range.

Figure 11:
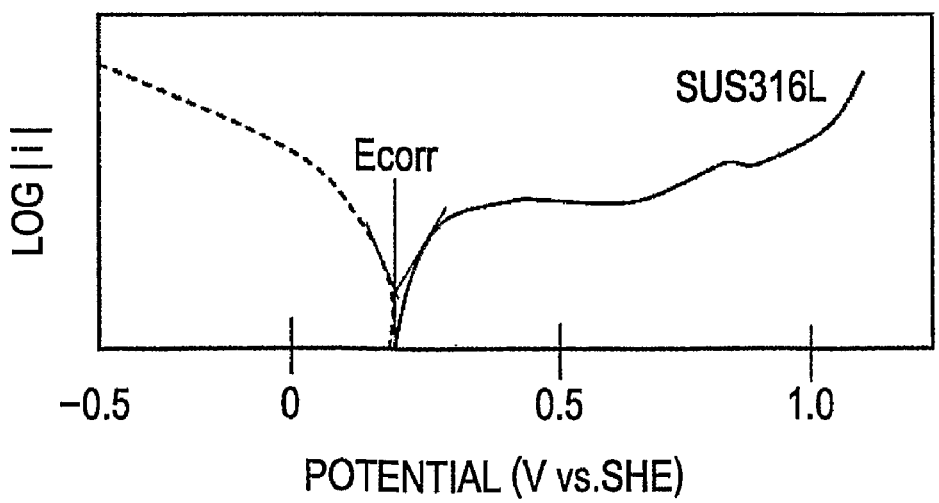
FIG. 11 is a graph including a polarization curve of a base material in an aqueous solution.

FIG. 11 shows a polarization curve of a base material in an aqueous solution. In the step of removing the oxide film, regardless of the presence or absence of the oxide film, the electrical potential applied to the base material is set to be lower than the corrosion potential $E_{corr}$ of the base material in the solution. In this example, SUS316L is used for the base material, and the corrosion potential $E_{corr}$ of the base material is 0.25 V vs. standard hydrogen electrode (SHE) in the state where the oxide film is formed. Accordingly, an electrical potential of −0.5 V vs. SHE is maintained for one minute in a solution with a pH of 4 to remove the oxide film.

Considering that a large number of separators are treated to remove oxide films, the acidity of the solution is preferably pH=2 to 7, and the temperature is preferably from room temperature to the operating temperature of the fuel cell, i.e., about 60° C. to 100° C. The electrolysis time is preferably short, though it depends on the area of the plate.

The corrosion-resistant coating layer 27 provided on the reaction-side surface 25 has corrosion resistance in the operating environment of the fuel cell. Therefore, except for specific aqueous solution environments (for example, strongly acidic conditions (pH<1), high temperatures (>200° C.), and high halogen concentrations (fluorine (F) ion concentration>1%), even when the entire separators are immersed in an aqueous solution to remove oxide films, the corrosion-resistant coating layer 27 on the reaction-side surface 25 is not damaged.

Example 3

In Example 3, oxide films on the back surface 26 of the first separator 7A and the back surface 26 of the second separator 7C are removed by machining, i.e., grinding and the back surfaces 26 thereof are then welded.

The surface roughness of the back surface 26 of the first separator 7A and the back surface 26 of the second separator 7C is controlled to a predetermined surface roughness X-2 (see FIG. 12) at portions surrounded by the temperature-control medium flow path 9 so as to increase conductive properties. On the other hand, at portions facing gaskets (not shown), the surface roughness is controlled to a value smaller than the surface roughness X-2 so as to improve the sealing property.

Figure 12:
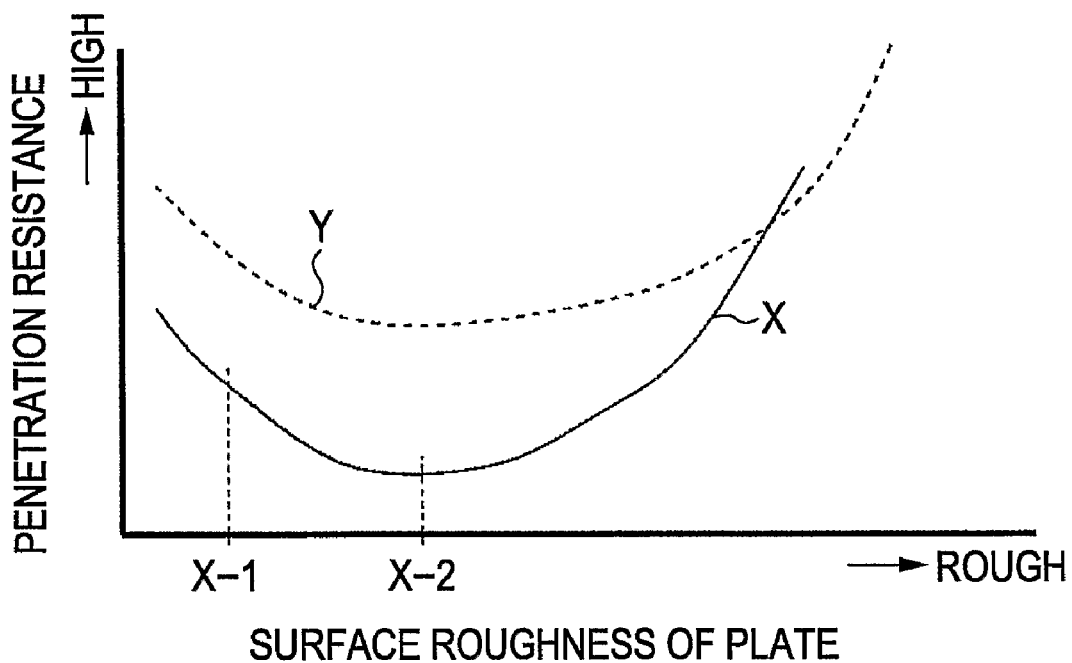
FIG. 12 is a graph showing the relationship between the surface roughness of the back surface and the penetration resistance of first and second separators according to an embodiment of the present invention.

FIG. 12 shows experimental results of measured penetration resistances of the first separator 7A and the second separator 7C, which were made of a metal X or a metal Y, in the case where the surface roughness of the back surface 26 of the first separator 7A and the back surface 26 of the second separator 7C was varied. Referring to FIG. 12, there is an absolute difference in the penetration resistance due to the difference in the material of the metal X and the metal Y. However, in each of the metal X and the metal Y, a sensitivity of resistance is present with respect to the surface roughness. The resistance of the metal X becomes the minimum at a surface roughness of X-2.

Figure 13:
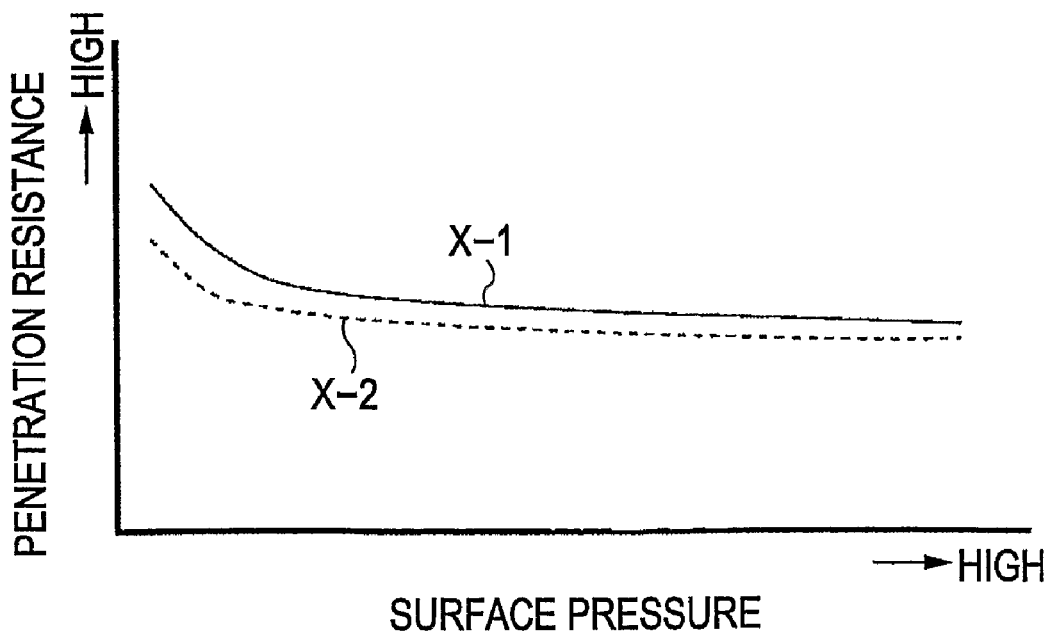
FIG. 13 is a graph showing the relationship between the surface pressure and the penetration resistance of first and second separators according to an embodiment of the present invention in the case where the surface roughness of the back surface is varied.

FIG. 13 shows experimental results of measured penetration resistances of the first separator 7A and the second separator 7C having a surface roughness of X-1 or X-2 in the case where the surface pressure between the first separator 7A and the second separator 7C was varied. Referring to FIG. 13, regardless of the value of the surface pressure, the first and second separators 7A and 7C having a surface roughness of X-2, which was the optimum roughness, showed low resistances.

Example 4

In Example 4, the back surface 26 of the first separator 7A and the back surface 26 of the second separator 7C are welded while the separators 7A and 7C are compressed with a predetermined load.

Figure 14:
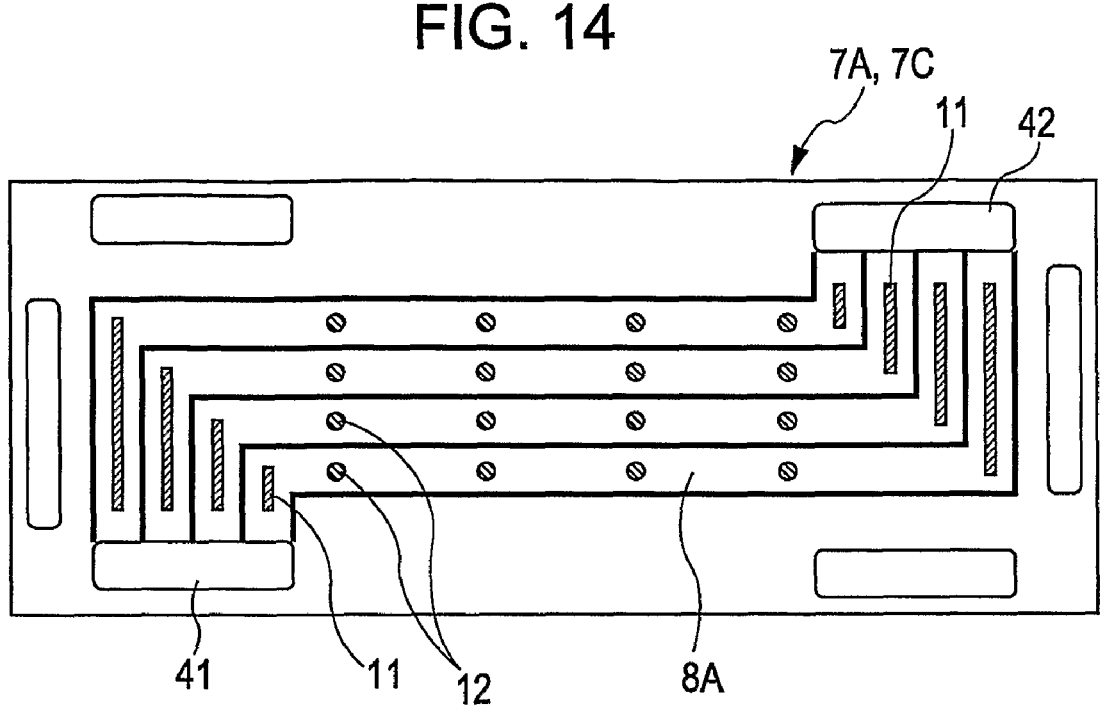
FIG. 14 is a schematic view of first and second separators according to an embodiment of the present invention.

FIG. 14 is a schematic view of the first separator 7A and the second separator 7C viewed from a reaction-side surface 25. In the first separator 7A and the second separator 7C, linear welded portions 11 are provided on areas linearly extending from an inlet manifold 41 and an outlet manifold 42 of a gas flow path 8A, and dot welded portions 12 are provided between the linear welded portions 11 at predetermined intervals.

The linear welded portions 11 and the dot welded portions 12 are arranged so that the penetration resistance of the first separator 7A and the second separator 7C at any position in a reaction area which is the farthest from these welded portions is a predetermined value (for example, 200 mΩ·cm$^2$) or less.

As described above, when the linear welded portions 11 and the dot welded portions 12 are appropriately arranged in accordance with the shape of the gas flow path 8A, the penetration resistance of the first separator 7A and the second separator 7C can be effectively reduced.

Figure 15:
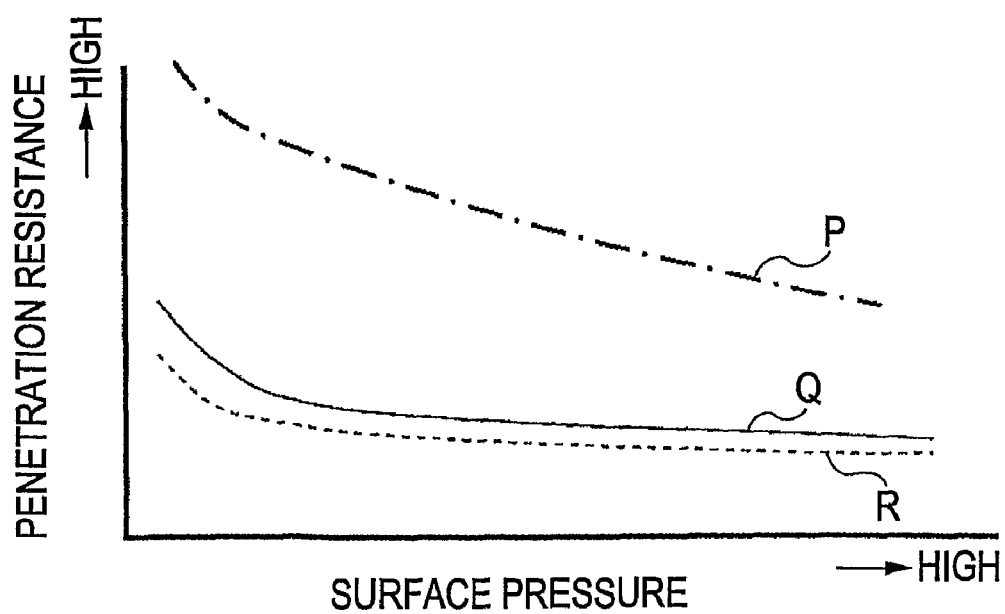
FIG. 15 is a graph showing the relationship between the surface pressure and the penetration resistance of first and second separators according to an embodiment of the present invention in the case where the amount of compression during welding is varied.

FIG. 15 shows experimental results of measured penetration resistances of the first separator 7A and the second separator 7C in the case where the surface pressure between the first separator 7A and the second separator 7C was varied. In FIG. 15, characteristic P represents a result in the case where the first separator 7A and the second separator 7C were not welded, characteristic Q represents a result in the case where the first separator 7A and the second separator 7C were welded while a surface pressure smaller than the predetermined value was applied to the back surface 26 of the first separator 7A and the back surface 26 of the second separator 7C, and characteristic R represents a result in the case where the first separator 7A and the second separator 7C were welded while the predetermined surface pressure was applied to the back surface 26 of the first separator 7A and the back surface 26 of the second separator 7C. These results showed that the penetration resistances of characteristics Q and R were markedly lower than the penetration resistance of characteristic P, and the penetration resistance of characteristic R was lower than that of characteristic Q over the entire range.

Example 5

In Example 5, the first separator 7A and the second separator 7C are welded, and a corrosion-resistant treatment is then performed by heat-treating at least the welded portions 10. In the heat treatment, the first separator 7A and the second separator 7C after the welding are placed in a furnace and heated by increasing the temperature.

Corrosion resistance of the welded portions 10 is decreased because of a change in the structure and a residual stress due to the thermal effect during welding. Consequently, on the reaction-side surface 25 of the second separator 7C disposed at the cathode side, the corrosion-resistant coating layer 27 is damaged at the welded portions 10 and peripheries thereof. However, the heat treatment is performed on the welded portions 10 and peripheries thereof, thereby suppressing the decrease in corrosion resistance due to the change in the structure and the residual stress during welding.

The method of performing the heat treatment is not limited thereto, and another heating method may be employed.

Example 6

In Example 6, the first separator 7A and the second separator 7C are welded, and a corrosion-resistant treatment is then performed by irradiating a laser beam 19 at least on the surfaces of the welded portions 10.

Figure 16:
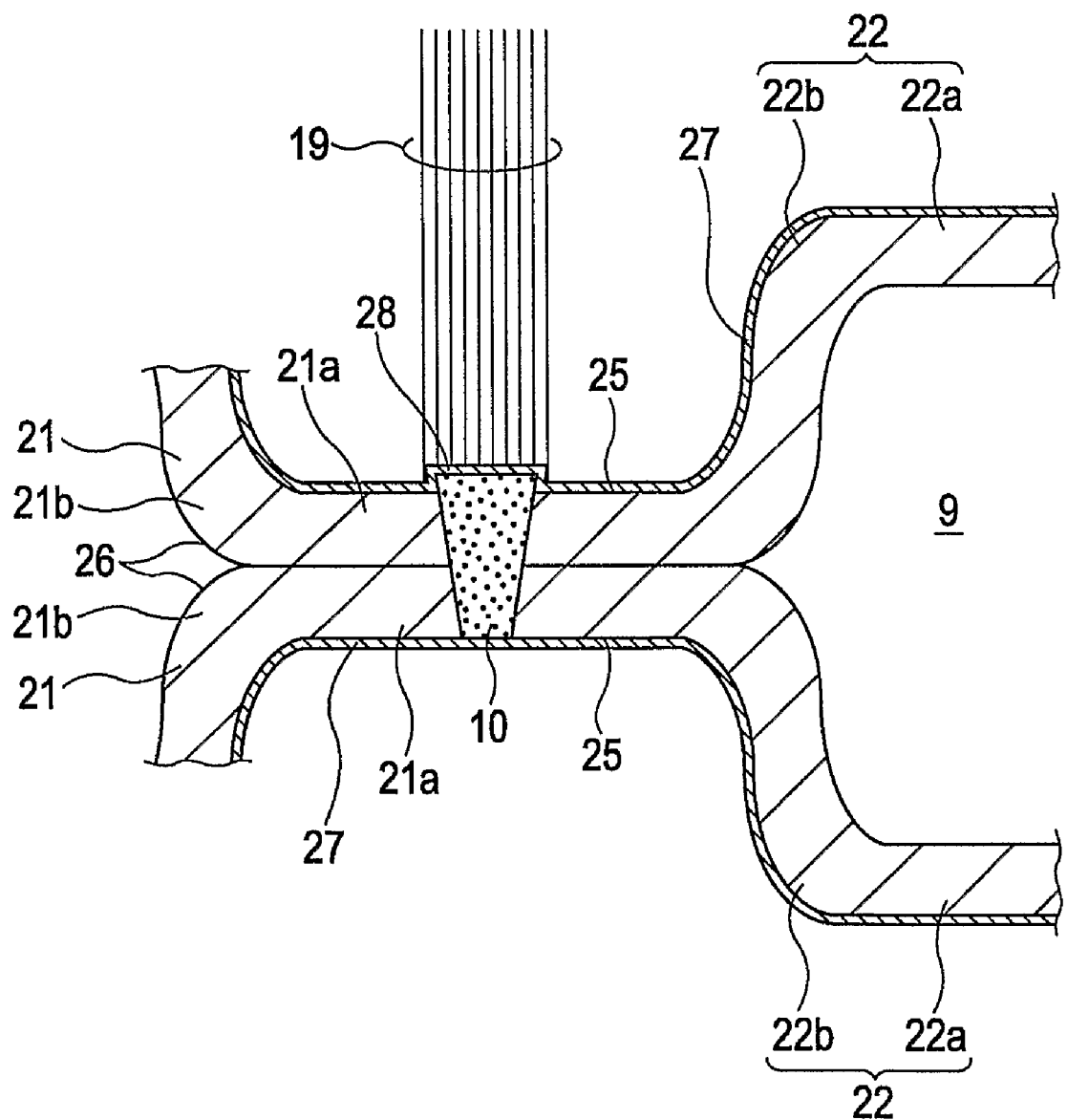
FIG. 16 is a schematic view showing a method of performing a corrosion-resistant treatment using a laser beam, according to an embodiment of the present invention.

FIG. 16 shows a process of welding the first separator 7A and the second separator 7C. The reaction-side surface 25 of the second separator 7C disposed at the cathode side is irradiated with the laser beam 19 in a room-temperature atmosphere to form the welded portion 10. After the welding, as a corrosion-resistant treatment, the surface of the welded portion 10 and the periphery of the welded portion 10 are irradiated with the laser beam 19 to heat the irradiated areas in the range of 80° C. to 200° C. Thus, an oxide film 28 is formed on the irradiated areas.

In the corrosion resistance treatment, after the welding, the laser beam 19 is irradiated while the output thereof is continuously decreased, thereby forming the oxide film 28 on the irradiated areas.

Alternatively, in the corrosion resistance treatment, after the welding, the laser beam 19 may be irradiated while the focusing area thereof is continuously expanded, thereby forming the oxide film 28 on the irradiated areas.

Corrosion resistance of the welded portions 10 is decreased because of a change in the structure and a residual stress due to the thermal effect during welding. Consequently, on the reaction-side surface 25 of the second separator 7C disposed at the cathode side, the corrosion-resistant coating layer 27 is damaged at the welded portions 10 and peripheries thereof. However, the corrosion-resistant treatment is performed by forming the oxide film 28 on the surfaces of the welded portions 10 and peripheries thereof, thereby suppressing the occurrence of corrosion on these portions. Furthermore, a heat treatment is locally performed by irradiating the laser beam 19. Accordingly, damage of the corrosion-resistant coating layer 27 can be suppressed.

When the laser beam 19 is irradiated while the output thereof is changed, welding and the heat treatment for forming the oxide film 28 can be continuously performed, thus markedly reducing the work-hours of this process. Furthermore, since the irradiated areas are limited to the welded portions 10 and peripheries thereof using the laser beam 19, the thermal effect on the first separator 7A and the second separator 7C can be reduced.

When the laser beam 19 is irradiated while the focusing area thereof is changed, welding and the heat treatment for forming the oxide film 28 can be continuously performed, thus markedly reducing the work-hours of this process. Furthermore, since the irradiated areas are limited to the welded portions 10 and peripheries thereof using the laser beam 19, the thermal effect on the first separator 7A and the second separator 7C can be reduced.

When the low-temperature heat treatment at about 80° C. to 200° C. is performed by the irradiation of the laser beam 19 to form the oxide film 28, a passive film that can withstand the operating environment of the fuel cell is formed. In contrast, when the oxide film 28 is formed by heating at 80° C. or lower, a satisfactory passive film that can withstand the operating environment of the fuel cell cannot be formed. When the oxide film 28 is formed by heating at 200° C. or higher, the oxide film 28 may be grown and a scale of the oxide film 28 may be formed. In such a case, the contact resistance between the first separator 7A and the second separator 7C may be increased.

On the reaction-side surface 25 of the first separator 7A disposed at the anode side, when the corrosion-resistant coating layer 27 is damaged at the welded portions 10 and peripheries thereof, a corrosion-resistant treatment can be performed by irradiating the laser beam 19 with a reduced output on the surfaces of the welded portions 10 and peripheries thereof to form the oxide film 28. Accordingly, the occurrence of corrosion on these portions can be suppressed.

Other heating methods may be employed for forming the oxide film 28.

Example 7

In Example 7, the first separator 7A and the second separator 7C are welded, and a corrosion-resistant treatment is then performed by immersing at least the welded portions 10 in an aerated acidic solution with a pH of 4 or less to form an oxide film.

Figure 17:
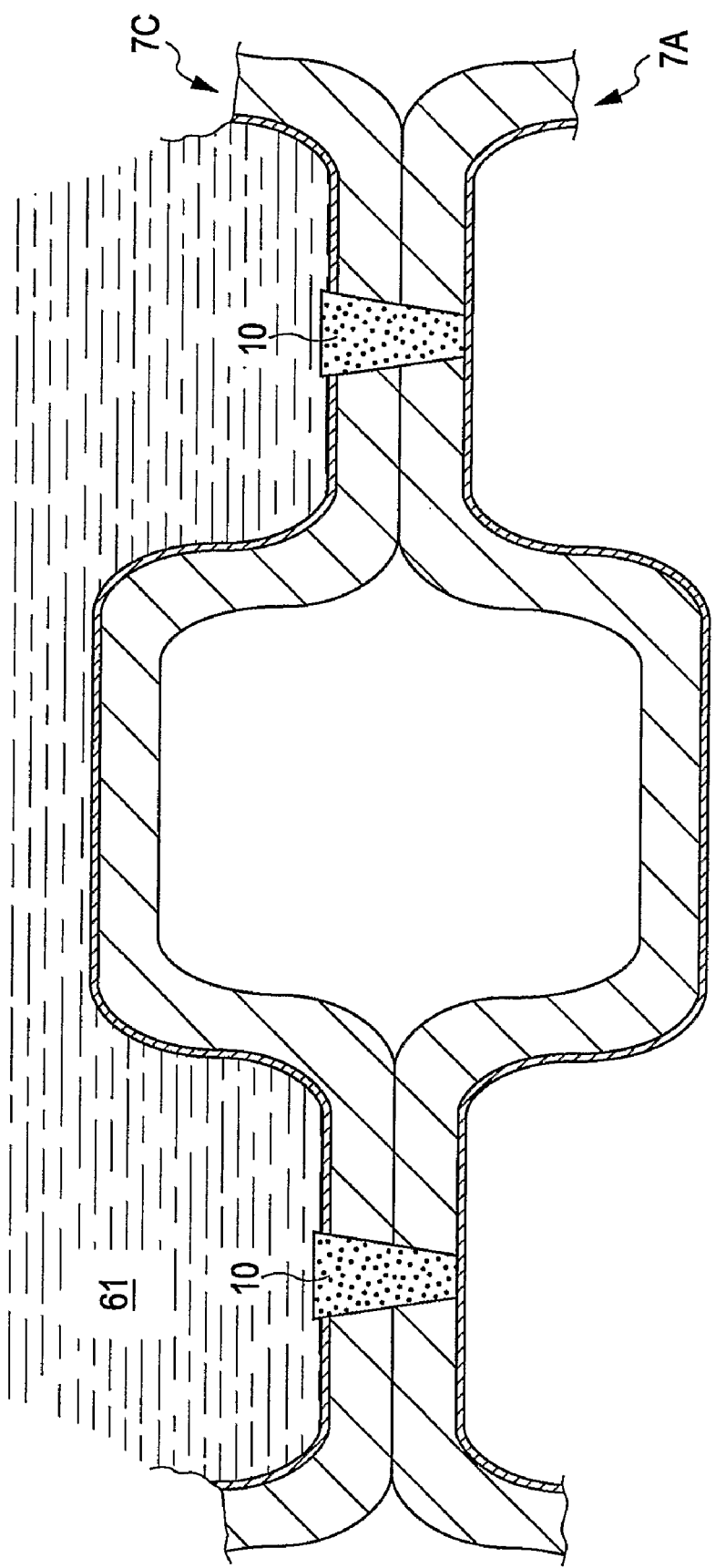
FIG. 17 is a schematic view showing a method of performing a corrosion-resistant treatment by immersing in a solution, according to an embodiment of the present invention.

As shown in FIG. 17, welded first and second separators 7A and 7C are immersed in an aerated 4.8 M nitric acid-acidic solution 61 at 50° C. for two hours to form a passive film on the welded portions 10. More specifically, grooves having the welded portions 10 are filled with the nitric acid-acidic solution 61.

Considering the corrosion-resistant treatment of a large number of welded first and second separators 7A and 7C, the temperature is preferably in the range of 40° C. to 80° C., and the first and second separators 7A and 7C are preferably immersed in a solution containing oxygen or oxidizing ions, such as nitric acid, with a pH of 1 or less for one hour to two hours.

The acidity of the 4.8 M nitric acid-acidic solution 61 is significantly higher than the pH in the fuel cell environment, and nitrate ions have high oxidizing properties. Therefore, a stable passive film that can withstand the operating environment of the fuel cell is formed on the surface of the SUS316L base material, which has been exposed by welding. The use of this method is advantageous in that a corrosion-resistant treatment of welded portions can be performed by simply immersing the welded portions in a solution. Furthermore, since the corrosion-resistant coating layer 27 is provided on the reaction-side surfaces 25 of the first separator 7A and the second separator 7C, the reaction-side surfaces 25 are not affected by the acid.

By immersing the welded portions 10 in a solution with a pH in the fuel cell environment or lower, a passive film can be selectively formed on the welded portions 10, thus suppressing the occurrence of corrosion on the welded portions 10. On the other hand, when the welded portions 10 are immersed in a solution having a pH higher than the value described above, a passive film that can withstand the fuel cell environment cannot be formed.

Example 8

In Example 8, the first separator 7A and the second separator 7C are welded, and a corrosion-resistant treatment is then performed by forming an oxide film by constant potential electrolysis while at least the welded portions 10 are immersed in an aerated acidic solution with a pH of 4 or less.

Figure 18:
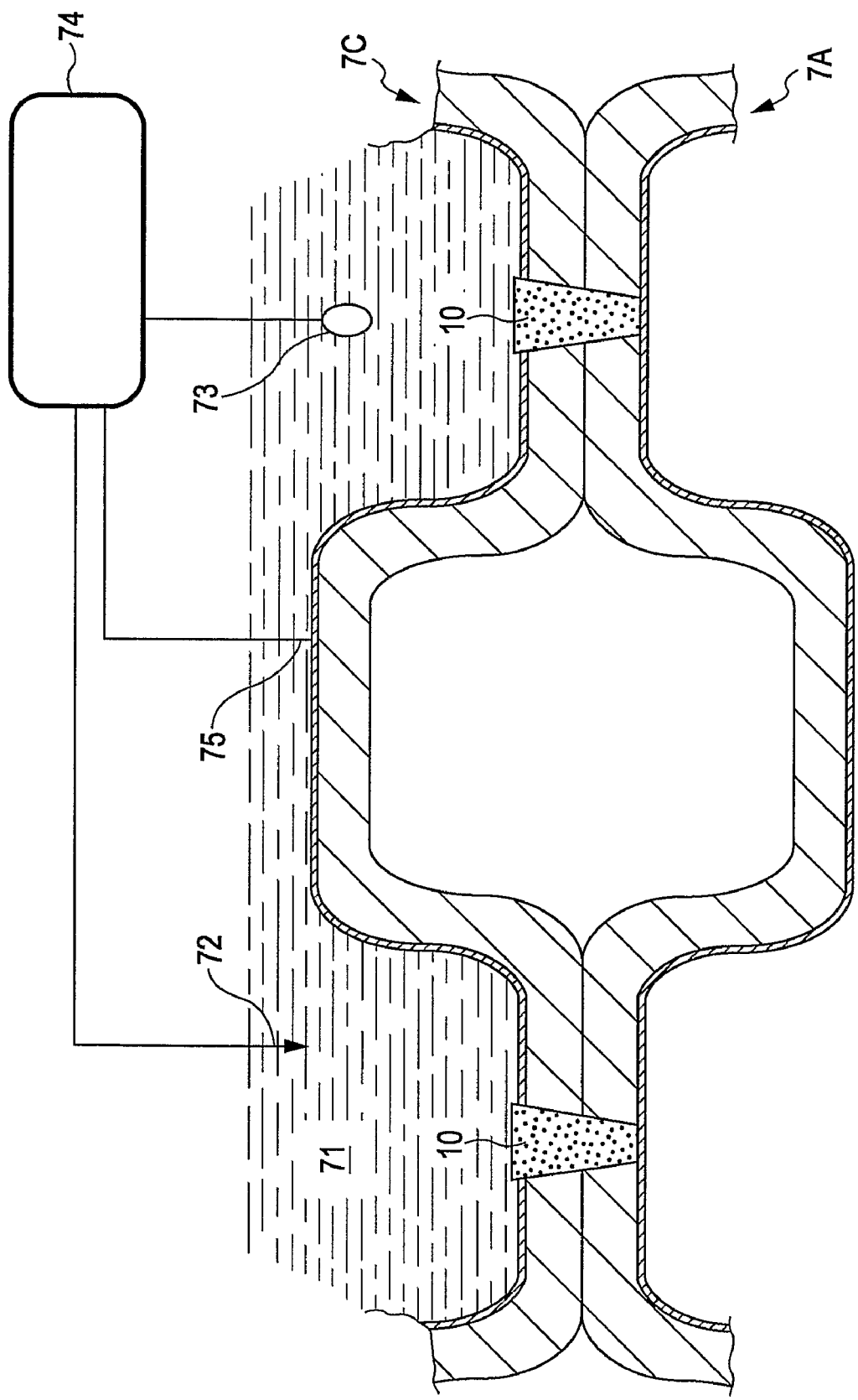
FIG. 18 is a schematic view showing a method of performing a corrosion-resistant treatment by electrolysis, according to an embodiment of the present invention.

As shown in FIG. 18, welded first and second separators 7A and 7C are immersed in an aerated sulfuric acid-acidic solution 71 at room temperature with a pH of 4, and a passive film is formed by constant potential electrolysis. A potential/current control device 74 includes an electrode 75 connected to the first and second separators 7A and 7C, another electrode 72 connected to the solution 71, and a reference electrode 73 for monitoring electric potential. The potential/current control device 74 provides the surface of the second separator 7C immersed in the solution 71 with a predetermined current and a predetermined potential via the reference electrode 73.

The potential applied to the surface of the second separator 7C is set in the range of 0.3 to 0.6 V (vs. SHE) on the basis of the graph of the polarization curve shown in FIG. 11. Accordingly, a passive film is formed on the surfaces of the welded portions 10. In contrast, when the potential is set to 0.3 V or less or 0.6 V or more, a passive film cannot be satisfactorily formed on the surfaces of the welded portions 10.

FIG. 11 is a polarization curve obtained by immersing a test piece of a SUS316L base material in an aerated sulfuric acid-acidic solution with a pH of 4 at room temperature, and then performing a potentiodynamic polarization measurement. According to this result, the SUS316L material is passivated in a potential range of 0.3 to 0.6 V vs. SHE.

Accordingly, in this example, a stable passive film is formed on the welded portions by performing constant potential polarization at a potential of 0.5 V vs. SHE for 30 minutes.

Figure 19:
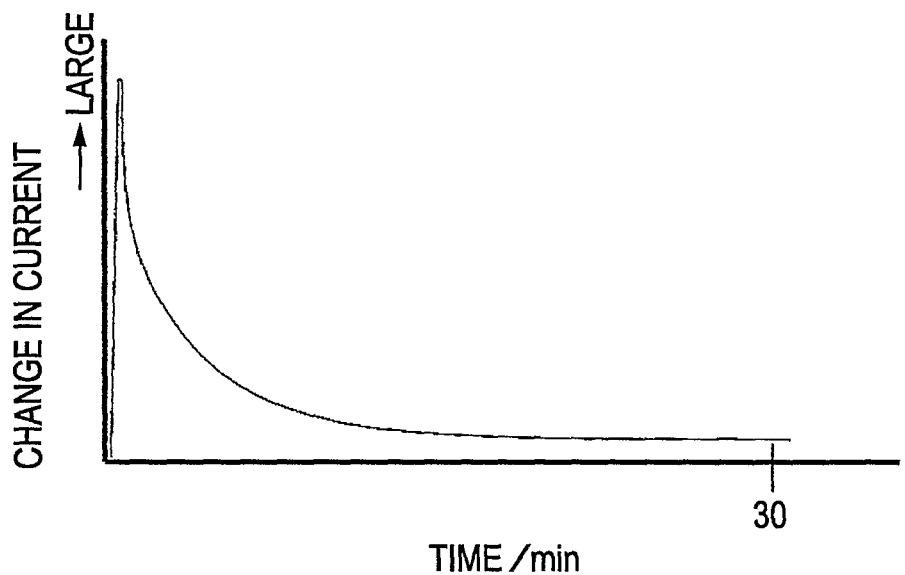
FIG. 19 is a graph showing a change in current during a constant potential electrolysis.

FIG. 19 is a graph showing a change in current in the SUS316L base material measured during constant potential electrolysis. Referring to FIG. 19, the current converges to a certain value after a 30-minute polarization. This result shows that a stable passive film is formed on the welded portions 10.

In this example, it is believed that the second separator 7C disposed at the cathode side is maintained in a potential range of 0.4 to 1.0 V vs. SHE during the operation of the fuel cell. Accordingly, a stable passive film is formed by polarizing at a potential of 0.5 V vs. SHE. In this example, an oxide film is forcibly formed on the surfaces of the welded portions 10 by applying a potential. Accordingly, a stable passive film can be formed compared with a method of simply immersing the welded portions 10 in an acidic solution.

In the method using constant potential electrolysis, an aerated solution with a pH in the range of about 1 to 7 is used, and the electrolysis time is about 1 to 30 minutes. In such a case, a stable passive film can be formed.

Figure 20:
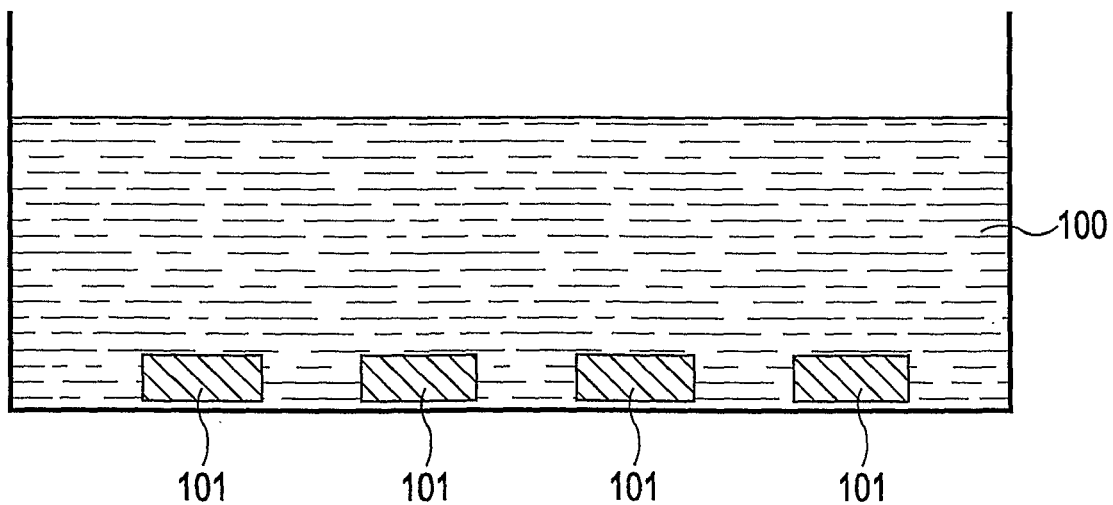
FIG. 20 is a schematic view showing a method of corrosion resistance evaluation test using cut samples of welded portions.

Corrosion resistance of the first and second separators 7A and 7C that were subjected to the corrosion-resistant treatment of a welded portion 10 by the method described in Example 5, Example 7, or Example 8 was confirmed as follows. The corrosion-resistant treatment was performed in accordance with the method described in Example 5, 7, or 8, and a welded portion was then randomly cut out from the first and second separators 7A and 7C with a cutter. As shown in FIG. 20, the cut samples 101 of the welded portion were immersed in a sulfuric acid-acidic solution 100 at 80° C. with a pH of 4, the acidic solution being prepared in a container, and a change in the mass before and after the immersion was measured with time. Thus, corrosion resistance of the sample prepared by performing each corrosion-resistant treatment was evaluated. In this evaluation test, a corrosion-resistant treatment was performed on the cut surfaces of the samples using a silicone sealing material.

Figure 21:
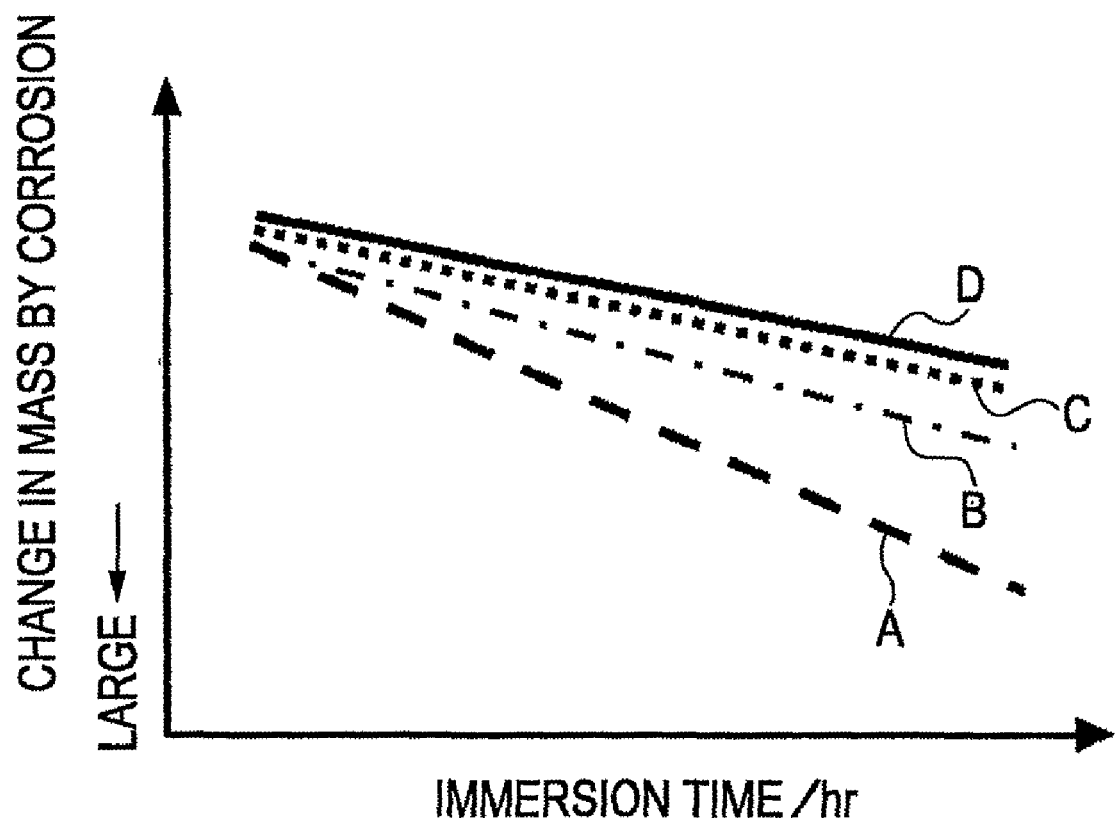
FIG. 21 is a graph showing changes in the mass of the cut samples of welded portions in the corrosion resistance evaluation test.

FIG. 21 is a graph showing a change in the mass of the cut samples 101 of the welded portion by corrosion in the case where the cut samples 101 were immersed in the solution for 200 hours. In FIG. 21, characteristic A represents a result in the case where no corrosion-resistant treatment was performed, characteristic B represents a result in the case where a low-temperature heat treatment was performed at 100° C. for one minute, characteristic C represents a result in the case where a sample was immersed in a 4.8 M nitric acid solution at 50° C. for two hours, and characteristic D represents a result in the case where electrolysis was performed at a potential of 0.5 V vs. SHE for 30 minutes while the sample was immersed in a sulfuric acid solution at room temperature with a pH of 2. As shown in FIG. 21, the change in the mass by corrosion was marked in characteristic A, and decreased in the order of characteristic B, characteristic C, and characteristic D.

Compared with these corrosion-resistant treatments, to simplify the pretreatment, the method of performing a low-temperature heat treatment described in Example 5 is preferred. To form a stable passive film and to simplify the process, the method of simply immersing in a solution described in Example 7 is preferred. To reliably form a passive film, the method of immersing and performing electrolysis described in Example 8 is preferred.

The above-described embodiments afford advantages described below.

(A) A cell 2 of a fuel cell includes a membrane electrode assembly 3 and metal first and second separators 7A and 7C. The membrane electrode assembly 3 includes a pair of electrode catalyst layers 5A and 5C and an electrolyte membrane 4 provided between the electrode catalyst layers 5A and 5C. The first separator 7A and the second separator 7C are disposed at either side of the membrane electrode assembly 3 to form gas flow paths 8A and 8C, respectively. A back surface 26 of the first separator 7A and a back surface 26 of the second separator 7C, the first separator 7A and the second separator 7C being included in adjacent cells 2 of the fuel cell, are in contact with each other, thereby forming a temperature-control medium flow path 9 through which a temperature control medium is supplied, the temperature control medium flow path 9 being disposed between the first separator 7A and the second separator 7C. In the first separator 7A and the second separator 7C, corrosion-resistant coating layers 27 are provided only on reaction-side surfaces 25 of the first separator 7A and the second separator 7C, the reaction-side surfaces 25 facing the membrane electrode assembly 3, and portions where the back surface 26 of the first separator 7A is in contact with the back surface 26 of the second separator 7C are joined. Accordingly, corrosion resistance of the first separator 7A and the second separator 7C can be ensured by the presence of the corrosion-resistant coating layer 27. Furthermore, the work-hours for forming the corrosion-resistant coating layer 27 on the back surface 26 of the first separator 7A and the back surface 26 of the second separators 7C can be reduced, thereby reducing the cost of the fuel cell. The resistance between the back surfaces 26, on which the corrosion-resistant coating layer 27 is not formed, can be reduced via a portion (welded portion 10) joining the back surfaces 26. Accordingly, the power generation performance of the fuel cell can be improved.

(B) A base material of the first and second separators 7A and 7C is a stainless steel containing at lest one of Fe, Ni, and Cr as a main component. Accordingly, oxide films are formed on the back surface 26 of the first separator 7A and the back surface 26 of the second separator 7C, thereby ensuring corrosion resistance required for the back surfaces 26 constituting the temperature-control medium flow path 9.

(C) Portions (rib flat portions 21a) constituting groove bottoms of the gas flow paths 8A and 8C of the first separator 7A and the second separator 7C, respectively, are welded. Accordingly, the welded portions 10 are formed at positions distant from the membrane electrode assembly 3, and thus the welded portions 10 are not relatively readily corroded. Therefore, even when the corrosion-resistant coating layer 27 is damaged by the formation of the welded portions 10, a decrease in corrosion-resistant performance can be suppressed.

(D) Each of the first separator 7A and the second separator 7C includes rib flat portions 21a and 22a extending so as to have a planar shape, and rib corner portions 21b and 22b bending at the ends of the rib flat portions 21a and 22a, respectively. The welded portions 10 joining the rib flat portions 21a are formed in an area extending from each rib corner portion 21b to the adjacent rib corner portion 22b. Accordingly, the welded portion 10 joins the entire area of each rib flat portion 21a, thereby increasing the welded area and reducing the resistance between the back surfaces 26. Furthermore, crevice corrosion caused between adjacent rib flat portions 21a can be suppressed.

(E) The ratio of a welded area to the contact area of the first separator 7A and the second separator 7C is set to 5% or more. Accordingly, the resistance between the first separator 7A and the second separator 7C can be reduced, thereby improving the power generation performance of the fuel cell.

(F) Oxide films on the back surface 26 of the first separator 7A and the back surface 26 of the second separator 7C are removed, and the back surface 26 of the first separator 7A and the back surface 26 the second separator 7C are then welded. Accordingly, the contact resistance between the first separator 7A and the second separator 7C can be reduced, thereby improving the power generation performance of the fuel cell.

(G) Oxide films on the back surface 26 of the first separator 7A and the back surface 26 of the second separator 7C are removed by applying a predetermined potential to the first separator 7A and the second separator 7C in a solution, and the back surface 26 of the first separator 7A and the back surface 26 the second separator 7C are then welded. Accordingly, the contact resistance between the first separator 7A and the second separator 7C can be reduced, thereby improving the power generation performance of the fuel cell.

(H) Oxide films on the back surface 26 of the first separator 7A and the back surface 26 of the second separator 7C are removed by grinding, and the back surface 26 of the first separator 7A and the back surface 26 the second separator 7C are then welded. Accordingly, the contact resistance between the first separator 7A and the second separator 7C can be reduced, thereby improving the power generation performance of the fuel cell.

(I) The back surface 26 of the first separator 7A and the back surface 26 the second separator 7C are welded while the first separator 7A and the second separator 7C are compressed with a predetermined load. Accordingly, the resistance between the first separator 7A and the second separator 7C can be reduced, thereby improving the power generation performance of the fuel cell.

(J) The welded portions 10 are formed by heating the second separator 7C disposed at the cathode side, and welding the first separator 7A and the second separator 7C. Accordingly, damage of the corrosion-resistant coating layer 27 due to the formation of the welded portions 10 can be suppressed on the first separator 7A disposed at the anode side, which is more susceptible to corrosion than the second separator 7C disposed at the cathode side. Thus, a decrease in corrosion-resistant performance can be minimized.

(K) The first separator 7A and the second separator 7C are welded, and a corrosion-resistant treatment is then performed at least on the surfaces of the welded portions 10. Accordingly, even when the corrosion-resistant coating layer 27 is damaged by forming the welded portions 10, the occurrence of corrosion on these portions can be suppressed.

(L) As the corrosion-resistant treatment, a heat treatment is performed at least on the welded portions 10. Accordingly, an effect of decreasing corrosion resistance caused by a change in the structure during welding and a residual stress can be reduced.

(M) As the corrosion-resistant treatment, an oxide film is formed at least on the surfaces of the welded portions 10. Accordingly, at least the surfaces of the welded portions 10 are passivated by the oxide film, thereby suppressing the occurrence of corrosion at these surfaces.

(N) As the corrosion-resistant treatment, an oxide film is formed by irradiating a laser beam 19 on at least the surfaces of the welded portions 10. Accordingly, the welded portions 10 and peripheries thereof are locally heated, thereby reducing the thermal effect on the other areas.

(O) Welding is performed by irradiating the laser beam 19 on the second separator 7C disposed at the cathode side, and an oxide film is then formed on the surface of the welded portion 10 by irradiating the laser beam 19 with a reduced output on the welded portion 10. Accordingly, welding and a heat treatment for forming the corrosion-resistant film of the welded portion 10 can be continuously performed, thus markedly reducing the work-hours of this process.

(P) Welding is performed by irradiating the laser beam 19 on the second separator 7C disposed at the cathode side, and an oxide film is then formed on the surface of the welded portion 10 by irradiating the laser beam 19 on the welded portion 10 while the focusing area thereof is expanded. Accordingly, welding and a heat treatment for forming the corrosion-resistant film of the welded portion 10 can be continuously performed, thus markedly reducing the work-hours of this process.

(Q) As the corrosion-resistant treatment, an oxide film is formed by immersing at least the surfaces of the welded portions 10 in an acidic solution. Accordingly, at least the surfaces of the welded portions 10 are passivated by the oxide film, thereby suppressing the occurrence of corrosion at these surfaces.

(R) As the corrosion-resistant treatment, an oxide film is formed by electrolysis while at least the surfaces of the welded portions 10 are immersed in an acidic solution.

Accordingly, at least the surfaces of the welded portions 10 are passivated by the oxide film, thereby suppressing the occurrence of corrosion at these surfaces.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A fuel cell stack comprising:
   a membrane electrode assembly including electrode catalyst layers and an electrolyte membrane between the electrode catalyst layers;
   a metal separator on each side of first and second surfaces of the membrane electrode assembly, each metal separator having a base material comprising a stainless steel containing at least one of Fe, Ni, and Cr as a main component and having a corrosion-resistant coating layer provided only on a reaction-side surface facing the membrane electrode assembly, each metal separator constituting gas flow paths,
   the membrane electrode assembly and the metal separators constituting a cell of a fuel cell; and
   a temperature-control medium flow path provided by forming joined portions where back surfaces of the metal separators of adjacent stacked cells are in contact with each other;
   wherein the joined portions are formed by welding portions of the metal separators that constitute groove bottoms of the gas flow paths; and
   wherein an oxide film is provided on a surface of respective welded portions after welding by at least one of:
      irradiating a laser beam on the surfaces of the welded portions to form an oxide film;
      immersing the surfaces of the welded portions in an acidic solution to form an oxide film; and
      performing electrolysis while the surfaces of the welded portions are immersed in an acidic solution to form an oxide film.

2. The fuel cell stack according to claim 1, wherein each of the metal separators has a corrugated shape including projecting portions constituting one of the gas flow paths provided on the membrane electrode assembly, and recesses constituting the temperature-control medium flow path, and peripheral portions of planar surfaces each disposed or the top of respective projecting portions, which constitute the groove bottom of the gas flow path, are joined by welding.

3. The fuel cell stack according to claim 1, wherein a ratio of a joined area corresponding to a joined portion to the contact area where the back surfaces of the metal separators are in contact with each other is 5% or more.

4. A method of producing a fuel cell stack comprising the steps of:
   forming a corrosion-resistant coating layer on a surface of individual metal having a base material comprising a stainless steel containing at least one of Fe, Ni, and Cr as a main component;
   forming a temperature control medium flow path by joining portions where surfaces of the metal separators of adjacent stacked cells not having the corrosion-resistant coating layer thereon are in contact with each other;
   performing a corrosion-resistant treatment on surfaces of welded portions of the joined portions after welding by at least one of:
      irradiating a laser beam on the surfaces of the welded portions to form an oxide film;
      immersing the surfaces of the welded portions in an acidic solution to form an oxide film; and
      performing electrolysis while the surfaces of the welded portions are immersed in an acidic solution to form an oxide film; and
   forming gas flow paths by joining the corrosion-resistant coating layers of the metal separators on each side of first and second surfaces of a membrane electrode assembly, the membrane electrode assembly including electrode catalyst layers and an electrolyte membrane between the electrode catalyst layers.

5. The method of producing a fuel cell stack according to claim 4, further comprising a step of: before the step of forming the temperature control medium flow path, removing an oxide film on the portions to be joined.

6. The method of producing a fuel cell stack according to claim 5, wherein the oxide film is removed by immersing the portions to be joined in a solution and applying a predetermined potential to the metal separators.

7. The method of producing a fuel cell stack according to claim 5, wherein the oxide film is removed by grinding the oxide film on the portions to be joined.

8. The method of producing a fuel cell stack according to claim 4, wherein the temperature control medium flow path is formed while the portions to be joined are compressed.

9. The method of producing a fuel cell stack according to claim 4, wherein, before the step of forming the temperature control medium flow path, the metal separator disposed at a cathode side of the membrane electrode assembly is heated.

10. The method of producing a fuel cell stack according to claim 4, wherein, in the step of forming the temperature-control medium flow path, the metal separator disposed at a cathode side is irradiated with a laser beam at a high output sufficient to form the welded portions, and the corrosion-resistant treatment is then performed by irradiating the laser beam with a reduced output on the surfaces of the welded portions.

11. The method of producing a fuel cell stack according to claim 10, wherein, in the step of forming the temperature-control medium flow path, the metal separator disposed at the cathode side is irradiated with a laser beam to form the welded portions, and the corrosion-resistant treatment is then performed by irradiating the laser beam on the surfaces of the welded portions while the focusing area of the laser beam is expanded.

* * * * *